May 11, 1937.   G. W. GWINN ET AL   2,080,266
WRAPPING ATTACHMENT FOR CIGARETTE PACKERS
Filed Feb. 28, 1934    11 Sheets-Sheet 1

INVENTOR
George W. Gwinn
BY Charles Arelt
Peter M. Nejedly
Sydney P. Prescott
ATTORNEY May 11, 1937.  G. W. GWINN ET AL  2,080,266

WRAPPING ATTACHMENT FOR CIGARETTE PACKERS

Filed Feb. 28, 1934   11 Sheets-Sheet 7

INVENTOR
George W. Gwinn
BY
ATTORNEY

May 11, 1937.    G. W. GWINN ET AL    2,080,266
WRAPPING ATTACHMENT FOR CIGARETTE PACKERS
Filed Feb. 28, 1934    11 Sheets-Sheet 9
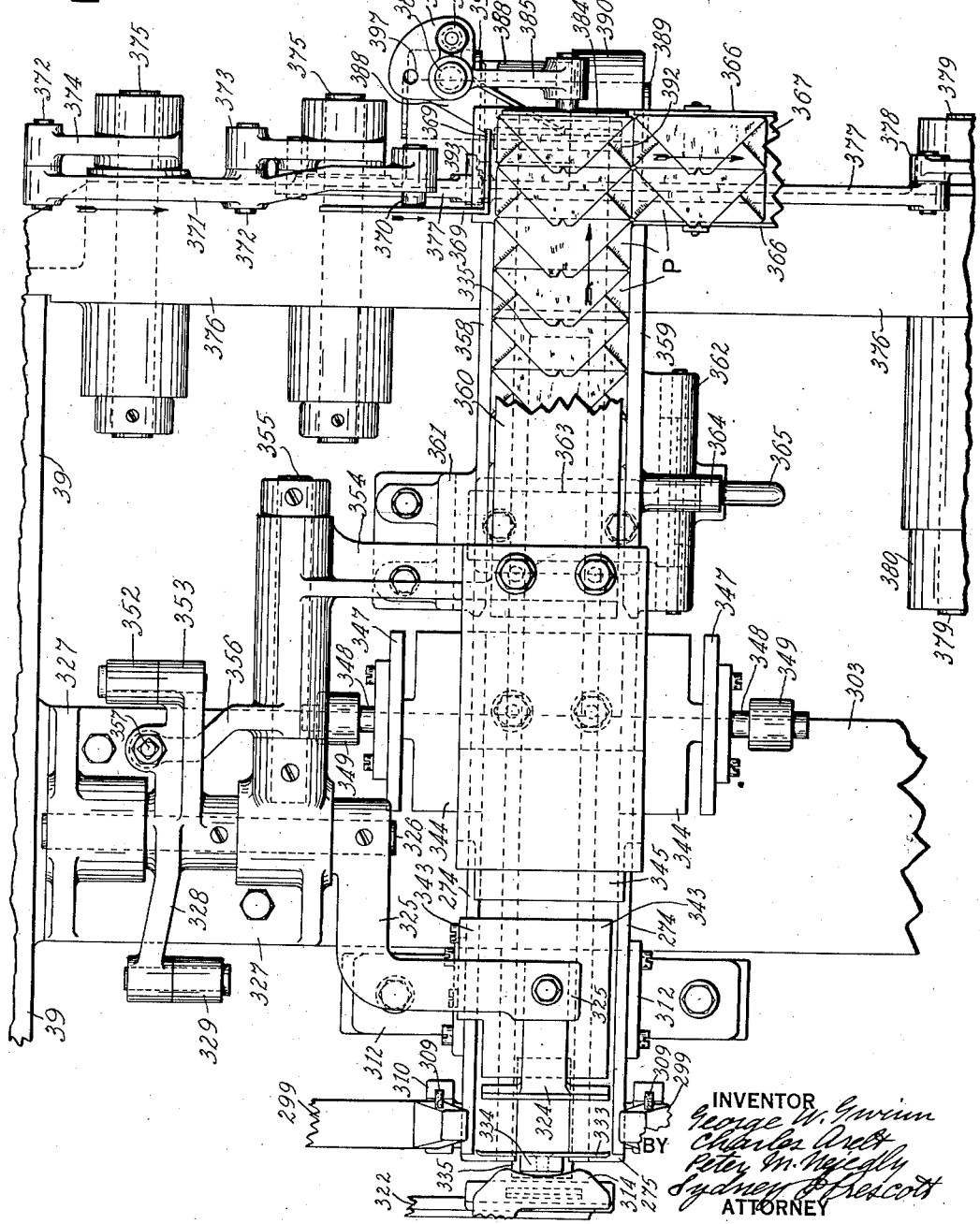

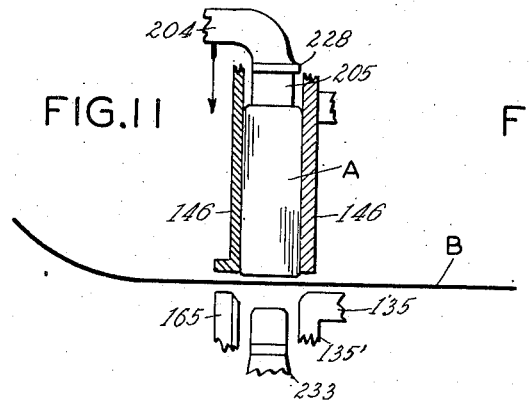
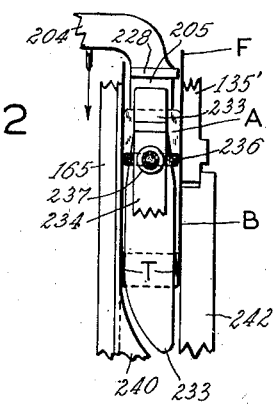
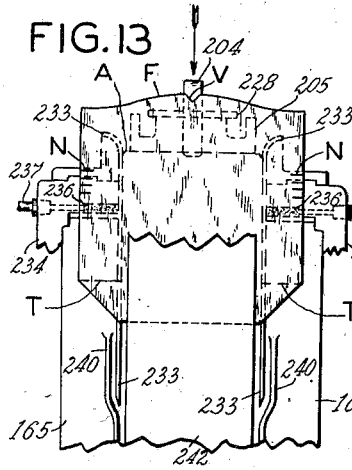
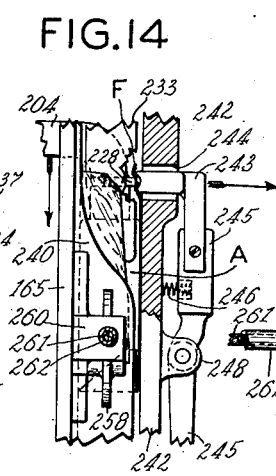
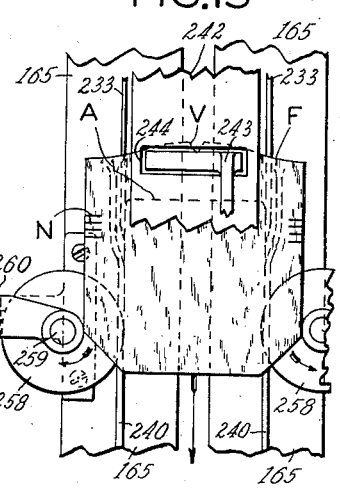
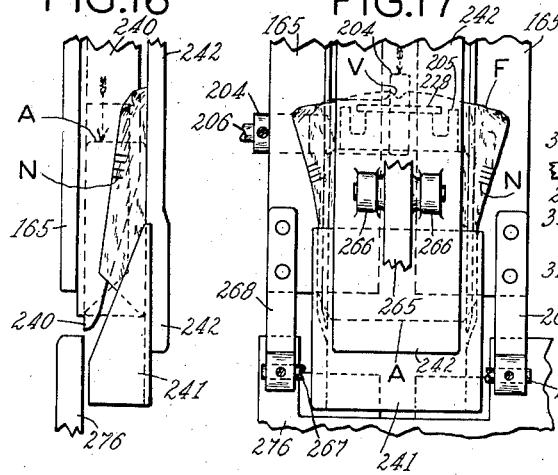
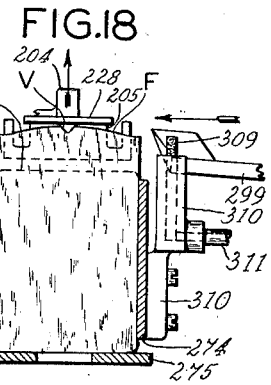

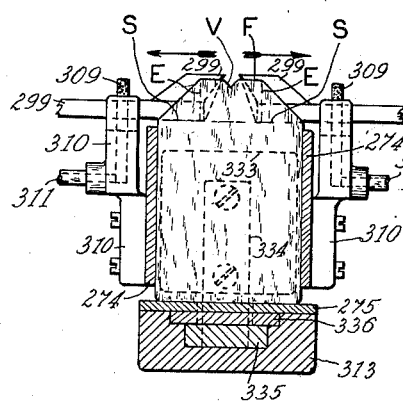

Patented May 11, 1937

2,080,266

UNITED STATES PATENT OFFICE 2,080,266

WRAPPING ATTACHMENT FOR CIGARETTE PACKERS

George W. Gwinn, Hewlett, Charles Arelt, Richmond Hill, and Peter M. Nejedly, Brooklyn, N. Y., assignors to American Machine & Foundry Company, a corporation of New Jersey Application February 28, 1934, Serial No. 713,416

60 Claims. (Cl. 93—2)

This invention relates to wrapping machines, more particularly to a wrapping machine suitable for attachment to cigarette packers, and adapted to apply an outer wrapper of moisture-proof regenerated cellulose, glassine, or other similar coated materials to the packages received from the packer and hermetically seal the wrapper. Accordingly, the main object of the invention is the production of a novel wrapping machine employing a novel principle for wrapping cigarette packages or other similar articles and hermetically sealing the wrapper.

Other objects of the invention are the provision of improved mechanism for retracting the pushers which move the packages through the wrapper folding device, means for centering the severed wrapper blank with respect to the path of the package, a double row package delivery feed which may be put into operation at will for convenience in cartoning, an improved nicking device having pointed nicking knives to pierce the web of wrapping material and then cut from within outwardly to the side edges of the web, a bowed web-severing knife carrying a V-shaped notcher, and an improved web-feed. A further object of the invention is to hook up the machine forming the present invention with a cigarette packaging machine so that a package detector acts as a by-pass gate incapacitating the web-feed if the wrapping machine is not in use, and by-passing the packages received from the packaging machine without wrapping them. With these and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 10 is a plan view showing the top folding and heat sealing devices and the package delivery feed;

Figs. 11 to 23 are different views of the successive steps of the packages through the wrapper folding mechanism; and Fig. 24 is a perspective view of the enveloped package after it has been sealed.

In carrying the invention into effect there is provided a device for folding a wrapper about a package, a web-feed for intermittently advancing the leading end of a web of wrapping material across the entrance of said device, means for severing a wrapper blank from the leading end of the web, a package feed for pushing a package into the severed wrapper blank and through said device to fold the wrapper about the package, means for applying adhesive between each fold of the wrapper, mechanism for centering the severed wrapper blank with respect to the path of the package into said device, means for heating the seams of the folded wrapper to dry out the adhesive between its folds and thus hermetically seal the wrapper, and a package delivery feed receiving the sealed packages from the heating means in a single row and delivering them in a double row. In the best constructions contemplated, the wrapper folding device includes a folding chute, and the package feed includes a package guide, a package chute leading to the wrapper folding device, a transfer arm adapted to push a package from the guide into the package chute, means for actuating said transfer arm, mechanism for incapacitating said arm-actuating means and web-feed when there is no package in the path of the arm, and an automatically retractable pusher for moving the package through the package chute and folding chute. In the preferred embodiment of the invention the web-severing means includes a transversely bowed web-severing knife and a V-shaped punch attached to the center of the knife to form a notch in the end of the wrapper blank being severed; and there is also provided a web-nicking device including pointed knife blades disposed to pierce the web within its side edges and cut outwardly to said edges. These various means and parts may be widely varied in construction within the scope of the claims for the particular machine selected to illustrate the invention is but one of many possible concrete embodiments of the same. The invention, therefore, is not to be restricted to the specific construction shown and described.

Figure 1:
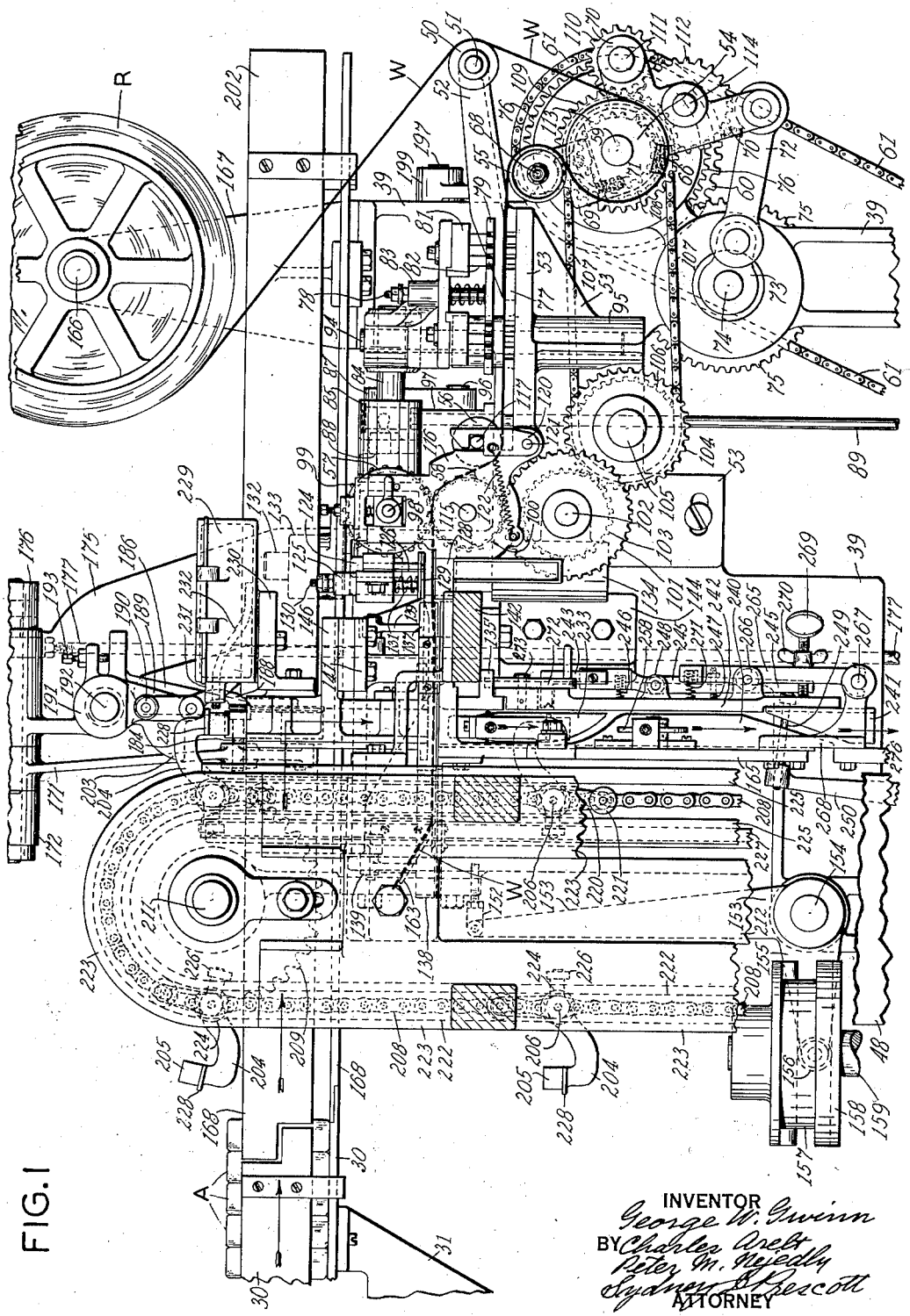
Fig. 1 is a side elevation of the upper part of the improved machine with part of its front frame broken away.

Referring to Fig. 1, the articles A, or in this case, the cigarette packages to be wrapped in moisture proof regenerated cellulose, glassine, or other similar coated materials, are delivered from a cigarette packaging machine (not shown) in upright position and fed into a package guide 30 supported by arm 31 of the packaging machine.

Figure 2:
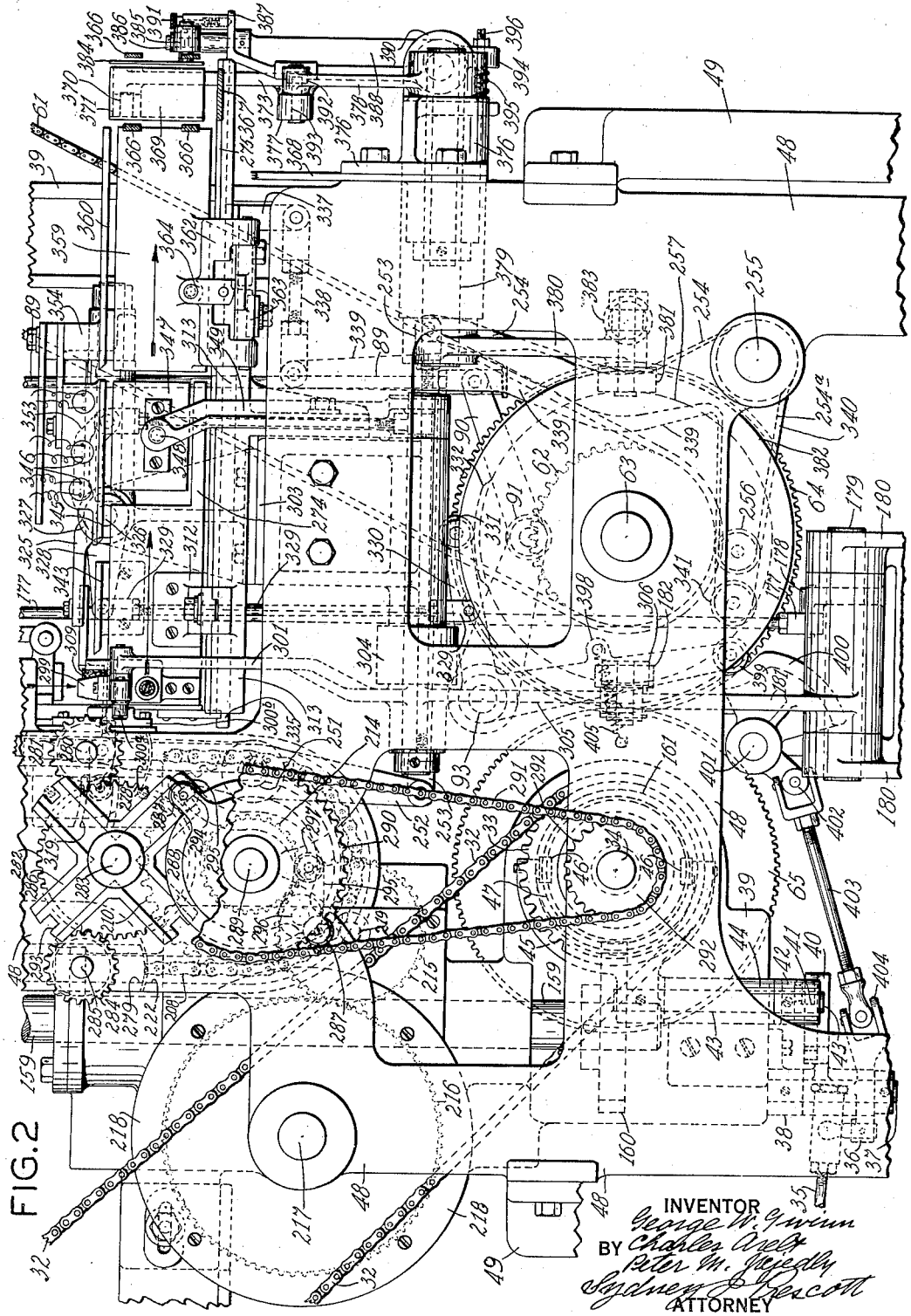
Fig. 2 is a side elevation of the lower part of the machine.

The wrapping machine forming the present invention is driven from the main drive of the packaging machine (not shown) by means of a chain 32 (Fig. 2) driving a sprocket 33 attached to drive shaft 34 of the wrapping machine. From the clutch operating lever of the packaging machine (not shown) a connecting rod 35 (Fig. 2) is linked by a ball and socket joint to a lever 36 loosely mounted on stud 37 held by a bracket 38 fastened to the lower part of the rear frame 39, which is connected to the front frame 48 by end frames 49. Lever 36 carries a cam sector 40 in the cam track of which engages a roller 41 on lever 42 fixed on a shaft 43 supported by a bracket 44 fastened to rear frame 39. On shaft 43 is also fixed a forked lever 45 carrying pins 46 engaging in the collar of a conventional friction or overload clutch 47 which is connected with driving sprocket 33 and shaft 34 in the usual manner, clutch 47 having the purpose of releasing the driving sprocket 33 from shaft 34 in case of a jam during the operation of the wrapping machine. In this manner the overload clutch 47 is controlled by the clutch operating lever of the packaging machine in order to insure engagement of the driving members of the wrapping machine during the operation of the packaging machine.

The regenerated cellulose glassine, or other wrapping material used in this wrapping machine is fed from a reel R in the form of a continuous web W over a guide roller 50 (Fig. 1) pivoted on a stud 51 held by an arm 52 supported by a bracket 53 attached to rear frame 39. From the guide roller 50 the web W is led over a pull roller 54, a loop pick-up roller 55 and another guide roller 56 to the feed rollers 57 and 58 which feed the web into the web-severing device and the wrapper centering mechanism. Between loop pick-up roller 55 and guide roller 56 the web W passes through a nicking device wherein the web W receives small cuts or nicks N which facilitate the removal and tearing of the wrapper when the wrapped article is to be used.

The web W is pulled continuously from the reel R by the continuous rotation of pull roller 54 fixed on shaft 59 supported in a bearing of the upper part of rear frame 39. Shaft 59 is driven continuously by means of a sprocket 60 (Figs. 1 and 4) which through a chain 61 is actuated from a sprocket 62 (Figs. 2 and 3) mounted on the cam shaft 63 supported in bearings of front frame 48 and rear frame 39. Cam shaft 63 is driven by means of a gear 64 meshing with a gear 65 which is mounted on drive shaft 34. In order to prevent slippage of the web W while being pulled from reel R, pull roller 54 is equipped with an insert 66 (Fig. 1) of suitable material such as cork, rubber, etc. The loop pick-up roller 55 over which the web W is looped back from pull roller 54 is mounted on a self-aligning bearing 67 (Fig. 4) which balances the roller by its center permitting roller 55 to adjust itself to the passing web W, thereby securing an even tension at the edges of the web. The self-aligning bearing 67 is mounted on a stud 68 fastened to a tension bracket 69 which is pivoted to the upper part of an arm 70, loosely mounted on shaft 59. A light compression spring 71 (Fig. 1) interposed between bracket 69 and arm 70 presses the roller 55 towards the roller 54 to effect the feeding of web W. The roller 55 also receives oscillatory bodily motion through the oscillation of arm 70 on shaft 59. This oscillatory motion of roller 55 is required to take up the slack in the web W occurring when the end of the same is stopped during the cutting operation while pull roller 54 keeps on feeding. Arm 70 is actuated through a connecting rod 72 from a crank 73 mounted on a shaft 74 supported in a bearing of rear frame 39. Shaft 74 is driven from a gear 75 thereon meshing with a gear 76 mounted on shaft 59. After leaving roller 55, the web W passes over a bed 77 mounted on bracket 53 and provided with a series of notches in its side edges. Above bed 77 is located the nicking device which provides the side edges of the web W with small cuts or nicks N, as experience has taught that regenerated cellulose is very hard to tear when its edge is unimpaired.

The nicking device consists of a nicking arm 83 (Figs. 1 and 4) supporting two slidable rods 78 to which is fastened a clamp plate 79 receiving tension from coil springs 80 surrounding rods 78 and having notches in its side edges registering with the notches in bed 77. To nicking arm 83 are adjustably secured the knife supporting blocks 81 which carry pointed nicking knife blades 82. The latter are spaced to register with the notches of bed 77 and plate 79, and their cutting edges are of such shape (Fig. 4) that by the downward motion of arm 83 the points of blade 82 pierce the web W within its edges and then cut outwardly to the edges of the portion of the web W clamped between bed 77 and plate 79. This arrangement has a great advantage over former constructions and methods, as it prevents tearing along irregular lines of the areas of the web being nicked, which are unsupported during the nicking operation, as they are in registry with the notches of bed 77 and plate 79.

Nicking arm 83 which transmits vertical reciprocating motion to the knife blades 82 is fixed on a horizontal shaft 84 (Figs. 1, 4 and 7) which is actuated from a lever 85 pivoted on a stud 86 held by bearing links 87. Lever 85 is equipped with an arm 88 which through a connecting rod 89 is operated by a cam lever 90 (Figs. 2 and 3) carrying a cam roller 91 engaging in a cam track 92 (Fig. 3), of gear 64 mounted on cam shaft 63. Cam lever 90 is pivoted on a stud 93 held in a bearing of rear frame 39. In order to assure a straight up and down movement of nicking arm 83 the latter is equipped with a vertical guide rod 94 slidably mounted in a guide sleeve 95 which is attached to bracket 53. Bearing links 87 are pivoted to stud 96 (Fig. 4) supported by a bearing bracket 97 mounted on a bracket 53.

Figure 4:
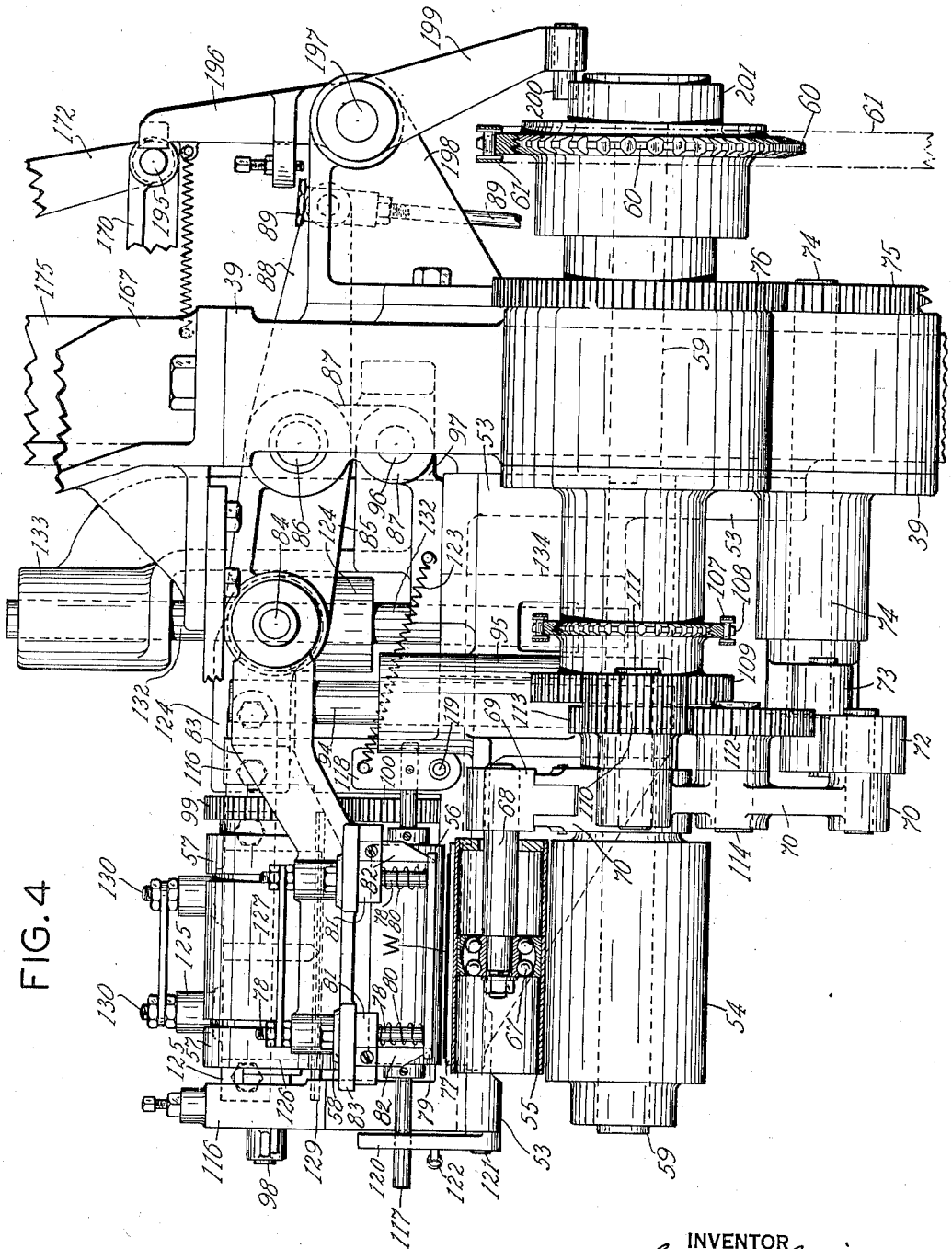
Fig. 4 is a sectional end elevation of the web-feed and the nicking device.

The movement of the leading end of the web W is controlled by the intermittent rotation of feed rollers 57 and 58 which engage the web beyond the guide roller 56. Feed roller 57 is mounted on a shaft 98 carrying a gear 99 meshing with a gear 100 driven by a gear 101 (Fig. 1) mounted on a shaft 102 supported by a bearing of bracket 53. To shaft 102 is mounted another gear 103 meshing with a gear 104 fastened to a shaft 105 also supported by bracket 53 and carrying a sprocket 106 which by means of chain 107 is driven from a sprocket 108 loosely mounted on shaft 59 (Figs. 1 and 4). Integral with sprocket 108 is a gear 109 meshing with a planet gear 110 pivoted to a stud 111 mounted on swinging arm 70. Planet gear 110 is actuated through a second planet gear 112 by a sun gear 113 which is fixed on shaft 59. Gear 112 is pivoted to a stud 114 also fixed in swinging arm 70. The intermittent motion required by feed rollers 57 and 58 is imparted thereto through sprocket 108 by means of crank 73 which through connecting rod 72 oscillates the arm 70 on which gears 110 and 112 are pivoted. While gear 113 is driven continuously by shaft 59 the planet gear 112 is driven only during the forward stroke of arm 70. During the backward stroke of the latter planet gear 112 just follows gear 113 without driving action, which causes gear 109 and sprocket 108 to stop. This effect may be obtained by providing an equal number of teeth on gears 112 and 113.

Feed roller 58 is mounted on the shaft 115 which carries gear 100. Shafts 98 and 115 are supported by the feed bearing frame 116 attached to bracket 53. Guide roller 56 which is located in front of feed roller 58 is pivoted to a shaft 117 one end of which is journaled in a swingable arm 118 (Fig. 4) pivoted to a stud 119 fastened to frame 116 while the other end of shaft 117 is supported in a groove of a hook lever 120 (Figs. 1 and 4). The latter is pivoted to a stud 121 on bracket 53 and is held in upright position by a tension spring 122. Arm 118 is also equipped with a tension spring 123 which swings roller 56 out of contact with the web W when hook lever 120 is pulled backward, this construction being employed for convenience in threading the web between the feed rollers.

Figure 7:
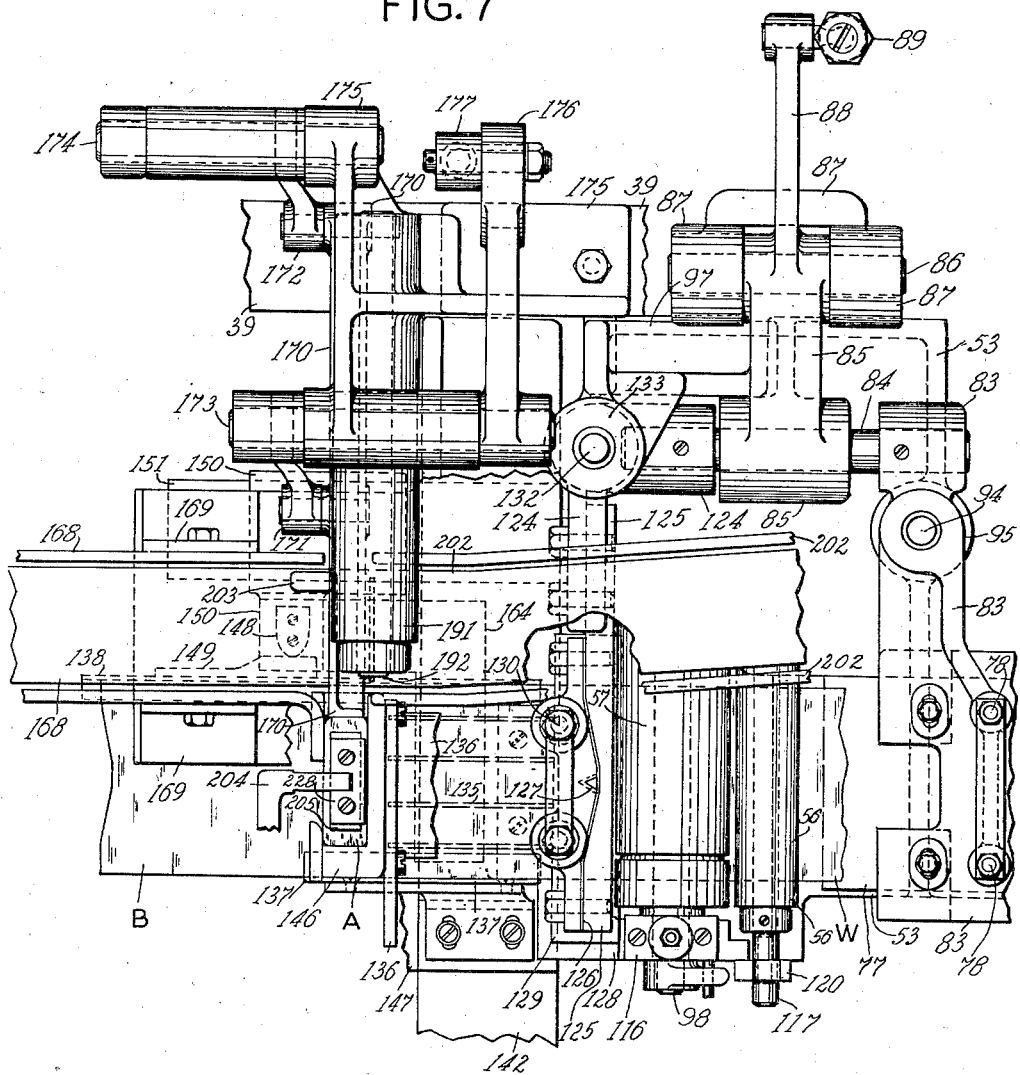
Fig. 7 is a plan view showing the package feed, the wrapper centering mechanism, and the web cutting device.

Immediately after passing feed rollers 57 and 58 the web W enters the web-severing device. The latter is operated simultaneously with and from the same shaft as the nicking device, the cutting head 124 being fixed on shaft 84 which transmits its vertical reciprocating motion to the web-cutting mechanism. To cutting head 124 is attached a cutting arm 125 to which is fastened a bowed knife 126 having a serrated cutting edge (Figs. 1, 4 and 7). To the center of the latter is attached a V-shaped punch 127 which forms a V-shaped notch in one end of the wrapper blank B while it is being severed from web W by the knife 126. This end of the wrapper later forms the top flap F of the wrapper B on the package A (Fig. 24). The V-shaped notch is made for the purpose of giving a good start for tearing the regenerated cellulose wrapper. When a wrapper is desired with the top flap F overhanging the outer edge of the package as shown in Fig. 24, a bowed web-severing knife is required in order that the bottom flap shall terminate short of the base of the top flap, and also to cut away the corners of the top flap to prevent overlapping and consequent bunching of the infolded side edges of the top flap during the tucking operation. During the cutting operation the web W is clamped between a cutting die 128 and a clamping plate 129 (Figs. 1 and 7). The latter is mounted on guide rods 130 equipped with coil springs 131 (Fig. 1) urging the plate 129 downwardly. Rods 130 are slidably supported by cutting arm 125. Cutting head 124 during its vertical reciprocating motion is guided by a vertical guide shaft 132 supported in bearing 133 of bracket 97 and bearing 134 of bracket 53.

Figure 5:
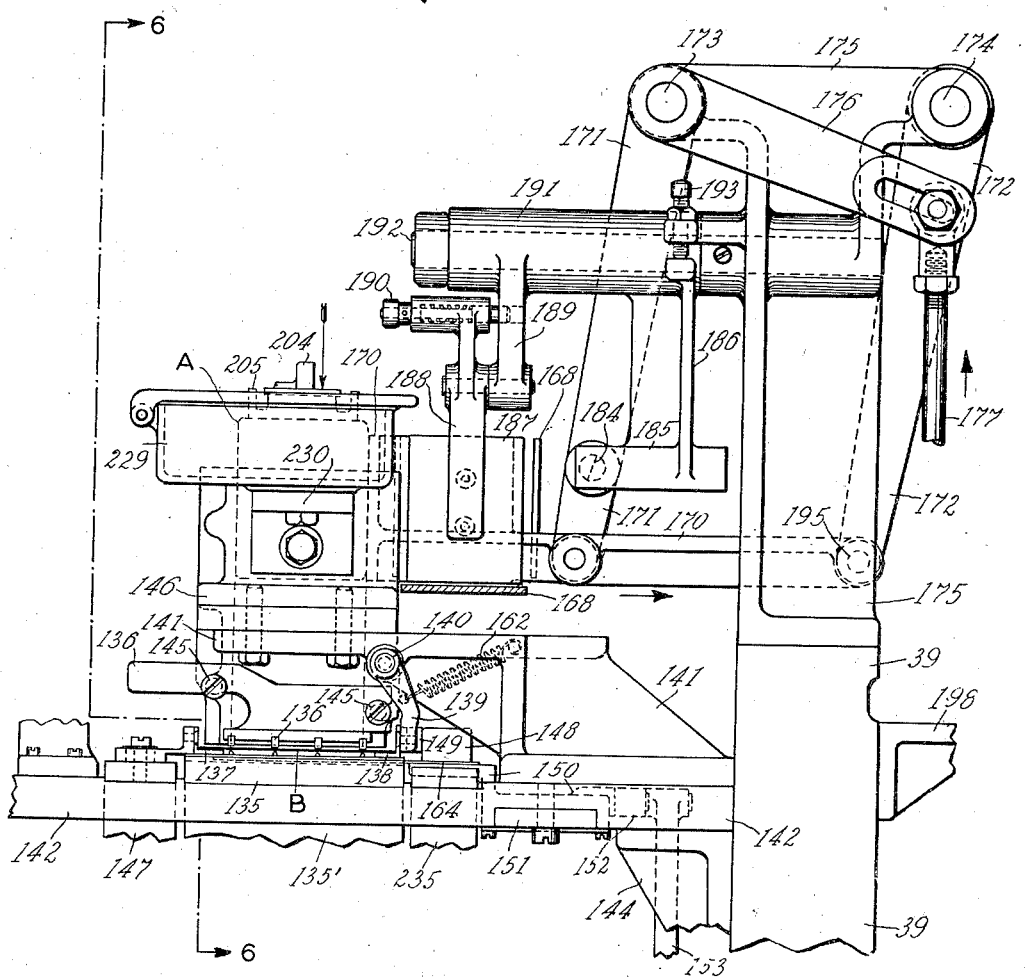
Fig. 5 is an end elevation of a portion of the package feed, and the wrapper locating and centering mechanism.

The leading end of the web W to be cut in lengths according to the size of wrapper required, is fed into the wrapper centering device (Figs. 5, 6 and 7), which consists of a stationary bottom guide plate 135, a stationary top guide gate 136, a stationary side guide rail 137 and a swingable side guide rail 138 (Fig. 5). The latter is attached to a pair of arms 139 (Figs. 5 and 6) pivoted to studs 140 held by a supporting bracket 141 mounted on a cross member 142 connected to front frame 48 and rear frame 39 by means of brackets 143 (Fig. 3) and 144 respectively. Bottom guide plate 135 is mounted on cross member 142 while the top guide gate 136 is carried by studs 145 (Fig. 5) in the vertical package guide 146 supported by bracket 141. Stationary side guide rail 137 is attached to a tucker supporting bracket 147 which is also mounted on cross member 142. The swingable guide rail 138 is operated by means of a slidably mounted cam lug 148 engaging with cam piece 149 attached to guide rail 138. Cam piece 149 has a wide and a narrow part as shown in Fig. 7. Cam lug 148 is mounted on a sliding bracket 150 slidably supported in the ways of a guide bar 151 fastened to cross member 142. To sliding bracket 150 is pivoted a connecting rod 152 through which the former is reciprocated by means of a lever 153 loosely mounted on stub shaft 154 (Fig. 1) held by rear frame 39. To lever 153 is secured another lever 155 carrying a cam roller 156 engaging in a cam track 157 of cam 158 mounted on shaft 159. The latter is driven by means of a spiral gear 160 (Fig. 2) meshing with a spiral gear 161 mounted on main drive shaft 34. Cam lug 148 and cam piece 149 are held in engagement by means of tension spring 162 fastened to arm 139 and bracket 141.

When web W enters the web-severing and centering devices, cam lug 148 engages with the narrow part of cam piece 149 which causes arms 139 and guide rail 138 to retreat, thereby widening the space between guide rails 137 and 138 to facilitate the entry of the web W therebetween. An inclined baffle plate 163 (Fig. 1) is installed under the leading end of web W to prevent it from curling during its advancing movement. To sliding bracket 150 is fastened a bridge plate 164 (Figs. 5, 6, and 7) which during the advance of the web W covers the entrance of the folding chute through which package A and wrapper B are pushed subsequently. As soon as the wrapper blank B is cut in the described manner from web W, cam lug 148 rides onto the wide part of cam piece 149 which causes guide rail 138 to push the wrapper blank B straight toward stationary guide rail 137 until the space between guide rails 137 and 138 is diminished to the actual width of the wrapper, thereby locating and centering the wrapper blank B in the exact desired position needed for folding (Fig. 5). Of course at the same time that sliding bracket 150 is moving the wide part of cam piece 149 against cam lug 148, bridge plate 164 slides away from the folding chute, the latter including a depending vertical projection 135' of bottom guide plate 135 and rear plates 165. The roll R of regenerated cellulose, glassine, or other wrapping material, is placed on a supporting rod 166 loosely mounted in bearings of brackets 167 attached to rear frame 39.

Figure 6:
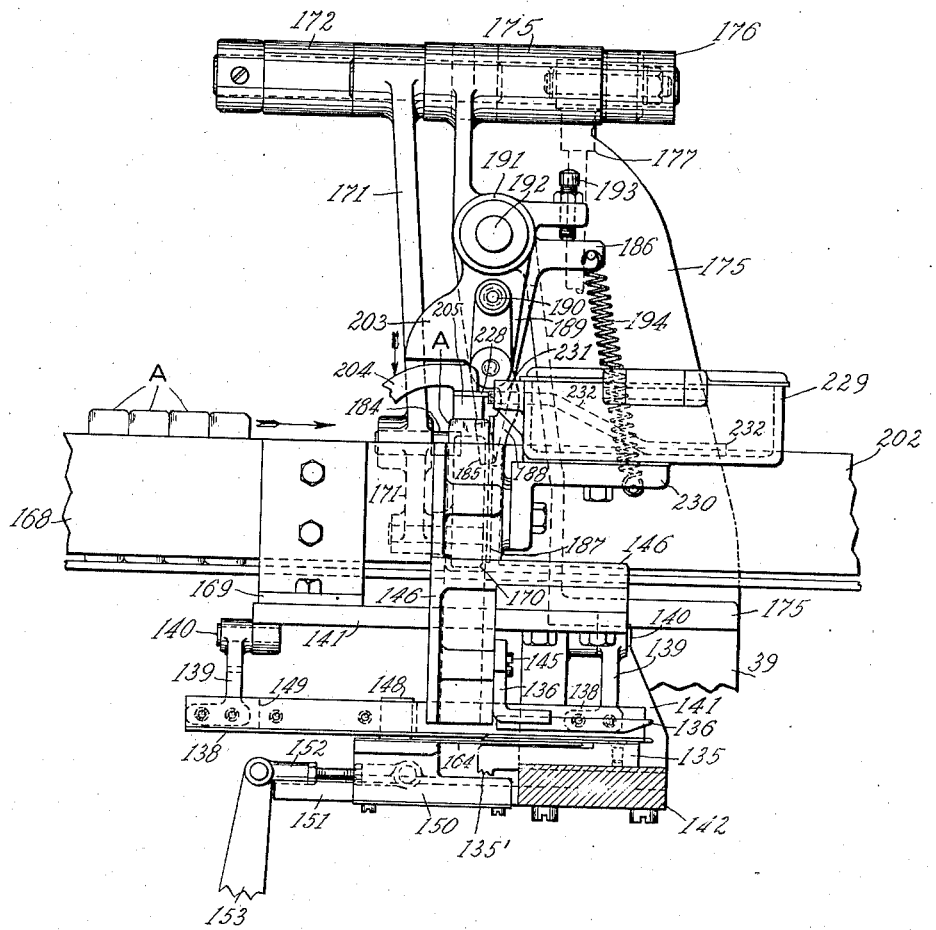
Fig. 6 is a side elevation of Fig. 5 taken on line 6—6 of Fig. 5.

The packages A delivered from the cigarette packaging machine (not shown) through guide 30 are fed into a package guide 168 which is held by means of brackets 169 (Figs. 6 and 7) fastened to supporting bracket 141. From guide 168 the packages are pushed into the vertical package chute 146 by means of a transfer arm 170 (Figs. 1, 5, 6 and 7). The latter is pivoted to an operating lever 171 (Fig. 5) and a supporting lever 172. Lever 171 is fixed to a shaft 173 while lever 172 is fastened to a shaft 174. Shafts 173 and 174 are supported in bearings of bracket 175 mounted on rear frame 39. Shaft 173 is actuated from lever 176 which through rod 177 is connected with a lever 178 (Figs. 2 and 3) mounted on shaft 179 loosely supported in bearings of bracket 180 attached to rear frame 39. Lever 178 has secured thereto a cam lever 181 carrying a cam roller 182 engaging with an open cam 183 (Fig. 3) mounted on cam shaft 63. Operating lever 171 is equipped with a control stud 184 which engages with a control plate 185 on control arm 186 after each return stroke and is released only when a package A, arriving at the transferring position, presses against the feeler plate 187 and moves the same slightly backward. Feeler plate 187 is fastened to a feeler arm 188 which is pivoted to a lever 189 and held in vertical position by a spring-pressed snap pin 190. Lever 189 and control arm 186 are integral with a sleeve 191 loosely mounted on shaft 192 supported by a bearing of bracket 175. The packages A to be transferred and wrapped are advanced step by step from the cigarette packaging machine. Whenever a package A presses feeler plate 187 backward control arm 186 also moves backward and releases control stud 184 from plate 185, permitting operating lever 171 to move transfer arm 170 forward and push the package from guide 168 into package chute 146. When no package arrives to act upon feeler plate 187, control stud 184 will remain in engagement with plate 185 and transfer arm 170 cannot operate. The setting of control arm 186 is adjustable by means of set screw 193 and tension spring 194 (Fig. 6).

In order to prevent waste of wrapping material as well as to avoid jamming the machine, the just described control mechanism is also connected with the web feed mechanism so that if no package is pressed against feeler plate 187 the web-feed will be stopped. For this purpose supporting lever 172 carries an operating pin 195 (Fig. 4) which on its backward stroke presses against a spring-tensioned lever 196 mounted on shaft 197 supported in bearings of bracket 198 on rear frame 39. To shaft 197 is fastened another lever 199 which carries a throw-out pin 200. To the hub of sprocket 60 is attached a standard automatic clutch 201 through which the shaft 59 is driven. Therefore, if no package arrives at the transferring position, operating pin 195 holds levers 196 and 199 in position to retain throw-out pin 200 in the path of the trip lever of clutch 201 (Fig. 4) and disengage the same. This causes shaft 59 and the web-feed mechanism driven therefrom to stop.

In case the packages delivered from the cigarette packaging machine are not to be wrapped, the wrapping machine may be put out of operation, and the package will then be advanced into a by-pass package guide 202 which is supported by brackets of rear frame 39. For this purpose feeler plate 187 is swung out of the way and the spring-pressed snap pin 190 engages behind a lug 203 (Figs. 1 and 6) of sleeve 191. In this manner feeler plate 187 is retained in a horizontal position, thereby permitting the packages to pass underneath and enter the by-pass package guide 202. Of course if feeler plate is not actuated by the packages A, transfer arm 170 remains in its backward position, which thus causes clutch 201 to remain disengaged.

After the packages A are transferred into the vertical package chute 146 they are pushed step by step with the centered wrapper blank B through the folding chute by pusher arms 204 travelling in the space between the rear plates 165. The path of the packages through the wrapping machine is indicated by arrows in Figs. 1 and 2. Pusher arms 204 are equipped with pusher lugs 205 which cover nearly the full top face of the package A, thereby assuring an even pressure upon the entire package during its movement through the folding chute. Pusher arms 204 are mounted on shafts 206 which are loose in bearing flanges 207 pinned in spaced relation to two endless chains 208 running over sprockets 209 (Fig. 1) and intermittently driven by sprockets 210. Sprockets 209 are fixed on shaft 211 loosely mounted in bearings of bracket 212 attached to front frame 48. Sprockets 210 are fast on shaft 213 (Fig. 3) supported in bearings of bracket 212 and rear frame 39. On shaft 213 is mounted a gear 214 (Fig. 2) which through an intermediate gear 215 is intermittently driven from gear 216 mounted on shaft 217. The latter is actuated from a conventional indexing device (not shown) enclosed in housing 218, the indexing device being driven from shaft 159. Intermediate gear 215 is pivoted to stud 219 supported by rear frame 39. On one end of each of the shafts 216 carrying the pusher arms 204 is secured a control lever 220 carrying a roller 221 adapted to engage in a cam track 222 of vertical cam plate 223 attached to front frame 48. To assure a straight vertical movement of the pusher arms 204 shafts 206 are furthermore equipped with a pair of guide rollers 224 running between vertical guide rails 225 (Figs. 1 and 3) attached to bracket 212. In order to prevent side play of arms 204 each flange bearing 207 carries also a guide roller 226 which engages in a U-shaped guide rail 227 held by bracket 212. To each of the pusher lugs 205 is fastened an adhesive carrying plate 228 which slightly projects over the front edge of the lug 205. On its way to meet the package A which has already been transferred into the vertical package chute 146 the pusher arm passes a reservoir 229 containing an adhesive solvent commercially known as "Cellosolve". The reservoir 229 is attached to package chute 146 by bracket 230 and is equipped with a slotted lug 231 through which extends a wick 232 immersed in the "Cellosolve" within the reservoir 229. As push lug 205 passes the exposed end of wick 232 (Figs. 1 and 6) the outer edge of paste carrying plate 228 touches the wick 232 and thereby picks up and carries along a small amount of "Cellosolve". Pusher lug 205 then engages with the top surface of the package A in the guide chute 146 (Fig. 11) and pushes the package down into the centered wrapper blank B lying in a horizontal position between guide rails 137 and 138. The package A together with the wrapper blank B is then pushed by pusher arm 204 and lug 205 through the bottom side tuckers 233, which form a part of the wrapper folding chute, Figs. 12 and 13, while the wrapper B is being draped in U-form over the sides of the package by guide plate 135 and rear plate 165. The tuckers 233 are attached to arms 234, one of which is held by bracket 147 while the other is mounted on bracket 235. In back of each tucker plate 233 is placed a wick 236 which is attached to arm 234. Tubes 237 connected with reservoirs 238 supply "Cellosolve" to each wick 236. The reservoirs 238 are adjustably mounted on brackets 239 mounted to the frames of the machine. The wicks 236 are disposed behind tuckers 233 and so located that their lateral faces touch the sides T of the bottom tucks (Fig. 12) and apply a thin layer of "Cellosolve" thereto without touching the inner faces of the outstanding side flaps beyond the tucks. Immediately after the bottom tucks are made, the package and wrapper are pushed through side flap folders 240 and 241 (Figs. 14, 15, 16 and 17).

Figure 3:
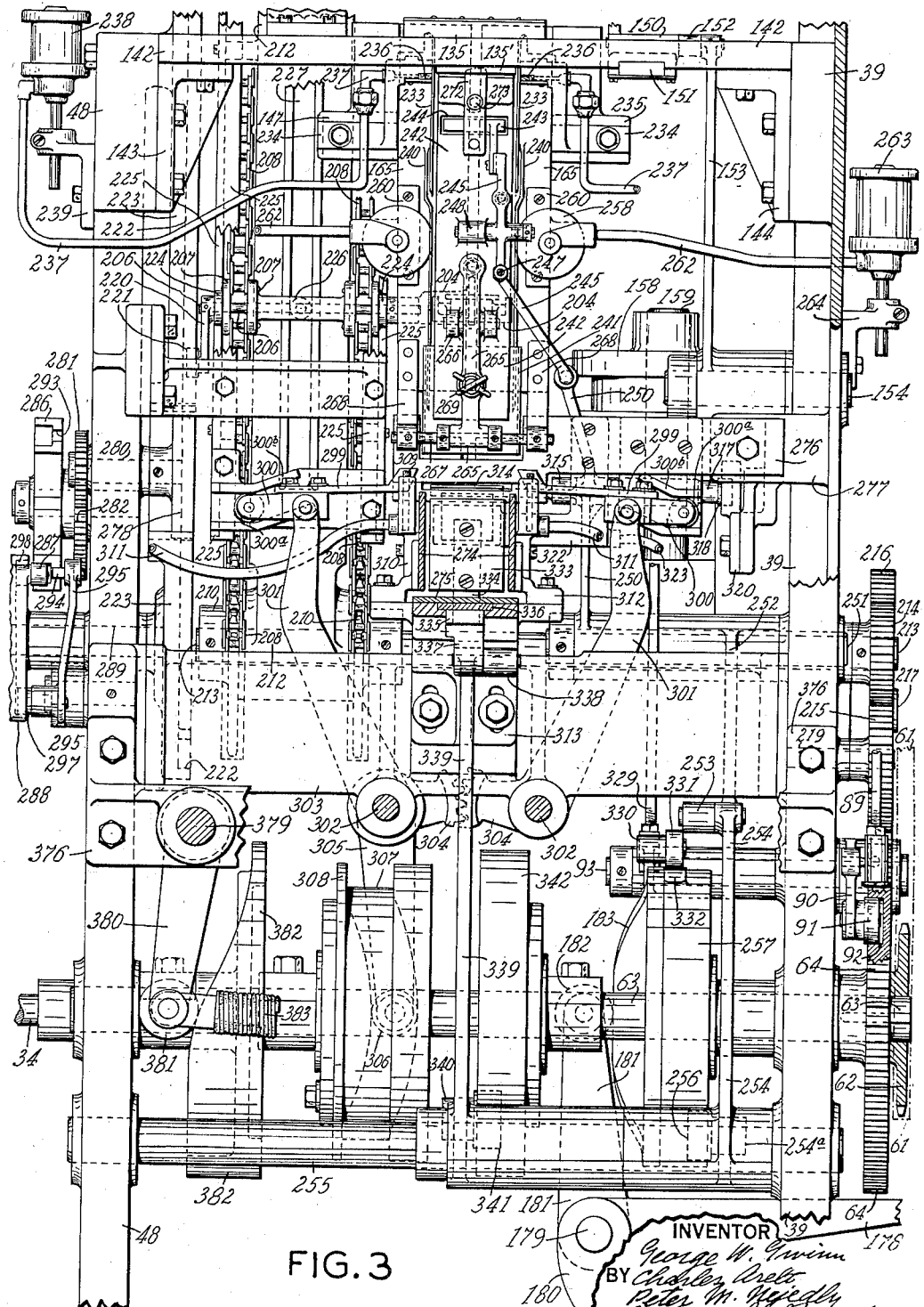
Fig. 3 is a partial end elevation of the machine showing the arrangement of the wrapper folding device.

Upon passing folder plates 240 attached to rear plates 165 the inner side flaps of the wrapper B are folded onto the sides of the package A (Fig. 14.) A removable guide plate 242 below guide plate 135, together with rear plates 165, guide the packages A while passing through the folders 240 and 241. The packages are pushed through the folders 240 and 241 with a step by step motion. After engaging the first folder plate 240 (Figs. 14 and 15) the package stops and a presser 243 enters through a transverse slot 244 of plate 242 and presses top flap F against the paste carrying plate 228 (Fig. 14), causing the "Cellosolve" which plate 228 received from wick 232 to be transferred onto the inside of top flap F of the wrapper B. Thereupon presser 243 retreats and the package is pushed a step further. Presser 243 is attached to an operating arm 245, which is urged outwardly by compression spring 246 to a position determined by the adjustment of stop screw 247 (Fig. 1), and it is pivoted in lugs 248 of plate 242. Operating arm 245 is actuated by means of a stud 249 (Fig. 1) mounted on an oscillating lever 250 (Figs. 1 and 3) loosely mounted on shaft 251 (Figs. 2 and 3) supported in a bearing of rear frame 39. To the hub of lever 250 is secured another lever 252 which through a connecting rod 253 is actuated from a cam lever 254 loosely mounted on shaft 255 supported in bearings of front frame 48 and rear frame 39, and having an arm 254a carrying a cam roller 256 engaging in a track of cam 257 (Fig. 3) mounted on cam shaft 63. Folder plates 240 which effect the first side fold of the wrapper B permit the adhesive applying wheels 258 to make contact through small longitudinal slots in folder plates 240 with the outside of the just folded inner side flaps (Fig. 15). Wheels 258 are loosely mounted on studs 259 supported in brackets 260 attached to rear plates 165. Each one of the two brackets 260 carries a wick 261 (Fig. 15), one end of which touches the paste applying wheel 258 while the other end is disposed in a tube 262 fastened to each bracket 260. Each tube 262 is connected with a receptacle 263 (Fig. 3) which supplies each wick 261 with "Cellosolve". Wicks 261 transfer the "Cellosolve" to wheels 258 which apply a stripe of "Cellosolve" to the external surface of the inner side flaps of wrapper B while the same are passing folder plates 240. Receptacles 263 are adjustably mounted in brackets 264 fastened in convenient places to the frames 48 and 39 of the machine. When the package passes folder plate 241 (Figs. 16 and 17) the outer side flap is folded onto the inner side flap and united thereto by the stripe of "Cellosolve" previously applied by wheels 258. The wrapper B is thus completely sealed around the bottom and sides of the package since each flap has received an application of "Cellosolve" at the proper place before folding. Folder plate 241 is mounted on guide plate 242 which is held in operative position by means of arm 265 pivoted to lugs 266 of plate 242 (Figs. 1 and 3). Arm 265 is detachably supported by rod 267 mounted in brackets 268 fastened to rear plates 165. Arm 265 furthermore carries an adjusting screw 269 having a lock nut 270 and engaging with guide plate 242. Between the latter and arm 265 is also mounted a compression spring 271. The upper part of guide plate 242 is secured by a lock lever 272 which is pivoted to stud 273 and engages in a slot of the vertical projection 135' of bottom plate 135.

The pusher arm 204 and lug 205 then push the package into a horizontal package guide consisting of two side guides 274 and a slotted bottom guide 275. To brackets 268 is fastened a bridge plate 276 which serves as rear guide for the package when the latter is pushed into the horizontal package guide. Bridge plate 276 is also fastened to a lug 277 (Fig. 3) of rear frame 39. Through the space between rear plates 165 and bridge plate 276, pusher lug 205 is retracted from the package after delivering the same into the horizontal package guide (Fig. 18). The retraction of the pusher lug 205 from the package is controlled by an intermittently revolving track section 278 (Figs. 2 and 3) into which roller 221 pivoted to control lever 220 enters after leaving the upper portion of cam truck 222 in cam plate 223. During the dwell of arm 204 and lug 205 track section 278 turns by 180 degrees which, through roller 221 and arm 220, also causes shaft 206 to turn by 180 degrees, and since pusher arm 204 and lug 205 are mounted on shaft 206, the said pusher arm and lug will swing backward and thus be retracted from the package. This construction of the pusher retracting mechanism permits operation at higher speeds than with cams formerly used for this purpose, and also retracts the pushers even while they are no longer moving the packages.

When chains 208, to which shaft 206 is attached by means of bearing flanges 207, resume their motion, roller 221 will leave track section 278 and enter the lower portion of cam track 222 in stationary cam plate 223. Upon leaving cam track 222, roller 221 will enter another periodically revolving track section 279 (Fig. 2) which, during the dwell of arm 204 and lug 205 will likewise make a half-turn, thereby swinging arm 204 and lug 205 back to their normal or package-engaging position. During the next step in the travel of chains 208, roller 221 again enters the upper portion of cam track 222 with arm 204 and lug 205 in normal position to engage with a new package A upon arrival at vertical package chute 146. Track section 278 is mounted on one end of shaft 280 carrying a gear 281 (Figs. 2 and 3) which is actuated by a gear 282 mounted on shaft 283. Gear 282 also actuates a gear 284 (Fig. 2) mounted on shaft 285 to one end of which is fixed the track section 279. Shafts 280, 283, and 285 are supported in bearings of front frame 48. To shaft 283 is secured a Geneva cross 286 (Figs. 2 and 3) which is intermittently rotated by diametrically opposite rollers 287 mounted on a disk 288 fastened to shaft 289 and alternately engaging the successive tracks of the Geneva cross. The shaft 289 carries a sprocket 290 (Fig. 2) which through chain 291 is driven from a sprocket 292 mounted on drive shaft 34. In order to assure that track sections 278 and 279 remain in exact alignment with the upper and lower portions of cam track 222 during entry and exit of roller 221, Geneva cross 286 is provided with lock notches 293 (Figs. 2 and 3) with which lock pin 294 engages during the dwell of Geneva cross 286. Lock pin 294 is mounted on a lock arm 295 pivoted to stud 296 supported by front frame 48. Lock arm 295 carries a roller 297 which engages in a cam track 298 of disk 288 (Fig. 3).

After the package is delivered into the horizontal package delivery guide, the open end of the wrapper is tucked by means of top tuckers 299 (Fig. 19) secured on operating lugs 300 (Figs. 2 and 3) pivoted to lever 301 loosely mounted on shafts 302 supported in bearings of cross frame 303 held by front frame 48 and rear frame 39. Each operating lug 300 carries a cam roller 300a which engages in a cam track of stationary cams 300b, one of which is attached to guide rails 225 while the other is supported by bridge plate 276. In order to secure a simultaneous movement of tuckers 299, levers 301 are provided with gear segments 304 meshing with each other. One of the levers is equipped with a cam lever 305 carrying a cam roller 306 engaging in a cam track 307 of cam 308 mounted on cam shaft 63. During the tucking operation the tuckers 299 apply "Cellosolve" to the side E of the top tucks adjacent the upstanding outer top flap F and the bottom S (Figs. 19 and 20) of the tucks. Just before the tuckers 299 engage the wrapper W (Fig. 18), the "Cellosolve" is transferred to the bottom and one side of the tuckers 299 by means of wicks 309 each of which is held in a slotted supporting plate 310 attached to the outside of side guides 274. The wicks 309 receive the "Cellosolve" by means of tubes 311 from a "Cellosolve" reservoir similar to reservoirs 238 and 263. Side guides 274 are supported by means of brackets 312 fastened to lugs of bottom bracket 313 attached to cross frame 303.

Upon the retreat of top tuckers 299 the upstanding shorter or inner top flap U of the wrapper W is folded down on the top face of the package by means of a top folder plate 314 (Figs. 20, 21 and 22) mounted on an operating arm 315. The latter is fastened to and actuated by a shaft 316 which is controlled by means of lever 317 carrying a roller 318 engaging in a cam track 319 of cam plate 320 attached to a lug of rear frame 39. Shaft 316 is loosely mounted in a bearing of oscillating lever 250 on shaft 251. The folder plate 314 simultaneously makes the first top fold and applies "Cellosolve" to the top surface of top flap U. The "Cellosolve" is transferred to the bottom of folder plate 314 by means of a wick 321 (Figs. 20, 21 and 22) held by a container arm 322 mounted on bridge plate 276. Wick 321 receives "Cellosolve" by means of a tube 323 (Fig. 3) which is attached to container arm 322 and connected with a "Cellosolve" reservoir similar to reservoirs 238 and 263. The wrapper is now completely folded around the package A except for the outer top flap F. The latter is folded over the top surface of the package and top flap U as the package is pushed underneath and past a top folder arm 324 which also acted as package guide while the package was pushed into the horizontal package guide by pusher lug 205. Top folder arm 324 is of the vertically oscillating type and is adjustably mounted on an operating arm 325 (Figs. 2 and 10) fastened to an oscillating shaft 326 supported in bearings of bracket 327 mounted on cross frame 303. Shaft 326 is actuated by means of lever 328 (Figs. 2 and 10) which through rod 329 is connected with a cam lever 330 (Figs. 2 and 3) carrying a roller 331 engaging with the periphery of the cam 257 which is equipped with a protuberance 332. The packages P in the horizontal package guide are periodically advanced by a reciprocating pusher plate 333 in front of which the packages are delivered when entering said horizontal guide. Pusher plate 333 is mounted on a supporting arm 334 attached to a slide 335 which is fastened to a guide plate 336 (Figs. 3 and 19). Slide 335 and guide plate 336 are slidably supported in grooves of bottom bracket 313 and covered by the partly slotted bottom plate 275 mounted on said bottom bracket 313. To slide 335 is attached a bearing lug 337 (Figs. 2 and 3) to which is pivoted a connecting rod 338 actuated by means of a cam lever 339 loose on shaft 255 and on its arm 340 with a cam roller 341 engaging in a cam track of cam 342 (Fig. 3) mounted on cam shaft 63.

Figure 8:
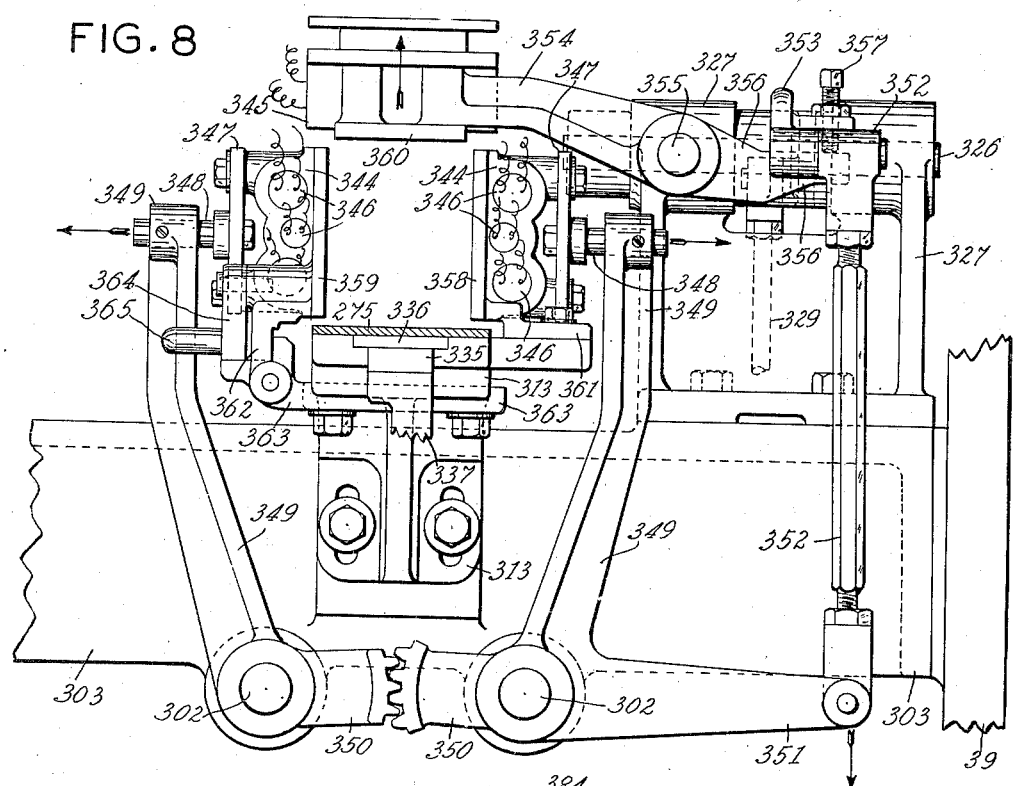
Fig. 8 is a sectional end elevation of the heat sealing means.

When the package P, which is now completely wrapped, leaves the top folder arm 324 it enters underneath a top guide plate 343 which is attached to one of the side guides 274 (Fig. 21). The wrapped package P is then further advanced by pusher plate 333 between side heater plates 344 and underneath top heater plate 345. Plates 344 and 345 (Figs. 2, 8 and 10) are equipped with electrical heating elements 346 which will effect quick drying of the "Cellosolve" in the seams of the packages to prevent the folds from opening up when the packages leave the machine. Since adhesive solvent was applied between each fold of the wrapper the package is thus hermetically sealed.

The side heater plates 344 are fastened to supporting plates 347 (Fig. 8) which by means of studs 348 are adjustably mounted on operating levers 349 pivoted on shafts 302. The levers 349 are equipped with intermeshing gear sectors 350. One of the levers 349 has an arm 351 which is connected by rod 352 with an arm 353 integral with the hub of oscillating lever 328 on shaft 326. Top heater plate 345 is attached to an operating arm 354 pivoted on stud 355 supported in a hub of bearing bracket 327. The hub of operating arm 354 is equipped with a tail 356 resting against a set screw 357 of lever 353. It is the object of this construction to swing the heater plates 344 and 345 out of contact with the moving packages P at every forward stroke of pusher plate 333, thereby assuring that the heater plates 344 and 345 will bear against the packages only during the time when the latter are at rest, so that no damage may be done to the seams of the wrapper. The movement of the heater plates 344 and 345 is, of course, synchronized with the oscillating motion of the top folder arm 324. After passing the heater plates 344 and 345 the hermetically sealed packages P enter a delivery channel formed by side guide plates 358 and 359, a top guide plate 360 and the bottom guide plate 275. Top guide plate 360 is mounted on the operating arm 354 and is therefore also swung out of contact with the advancing packages P at every forward stroke of pusher plate 333. Side guide plate 358 is equipped with a bracket secured to a lug of bottom bracket 313. Side guide plate 359 carries a hinge 362 pivoted to a hinge lug 363 fastened to bottom bracket 313. A lock lever 364 equipped with a handle 365 holds guide plate 359 in position, the lever 364 being fulcrumed on the plate 359 and engaging the lug 363 with its free end.

As some of the manufacturers desire the sealed packages delivered in a double row in order to facilitate the packing of the same into cartons, the machine is equipped with a so-called double stacker, or double row package delivery feed, which pushes two sealed packages at the same time into a delivery guide (Fig. 10) connected with a delivery and packing table (not shown). The delivery guide consists of side rails 366 and a table 367, which are disposed at right angles to the end of side guides 358 and 359. Rails 366 and guide 367 are supported by a suitable bracket 368 fastened to the frame of the machine.

Figure 9:
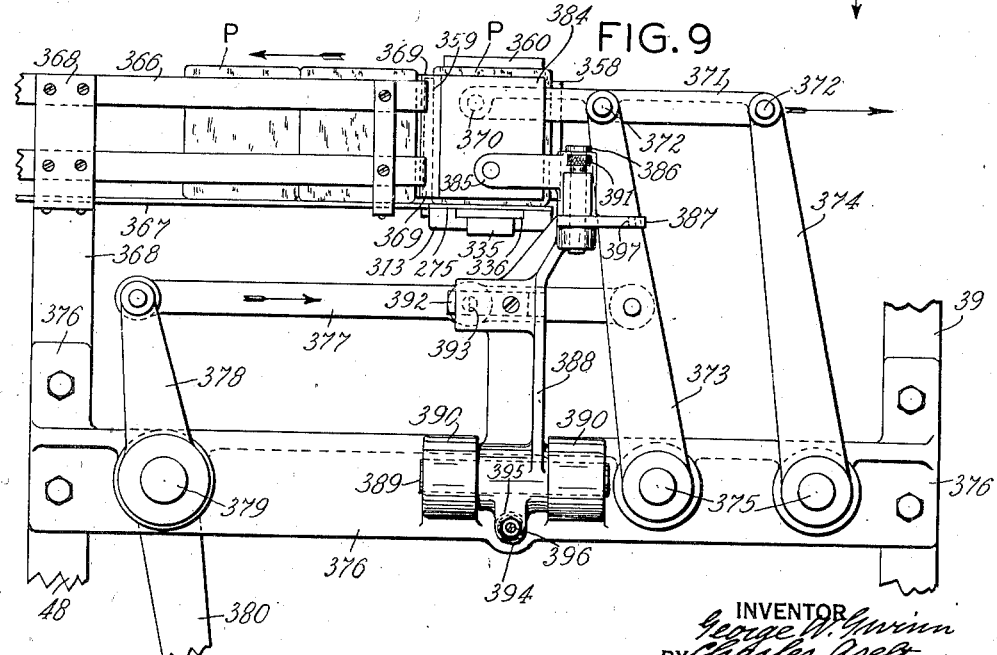
Fig. 9 is an end elevation showing the delivery end and the double row package delivery feed of the machine.

The packages P are transferred into the delivery guide by an intermittently reciprocating ejecting plate 369 fastened by stud 370 to an ejecting arm 371 (Figs. 9 and 10). The latter is pivoted by means of studs 372 to operating lever 373 and arm 374, both of which are loosely mounted on shafts 375 supported in bearings of frame bracket 376 mounted on frames 48 and 39. Operating lever 373 is actuated through a link 377 by a lever 378 fixed on a shaft 379 also supported in bearings of frame bracket 376, the shaft 379 being oscillated by means of a cam lever 380 (Figs. 2 and 3) carrying a cam roller 381 held in engagement with the open cam 382 mounted on the cam shaft 63, by means of a tension spring 383 (Fig. 3).

The forward movement of ejecting plate 369 and arm 371 is controlled by means of a feeler plate 384 adjustably supported by a lug 385 loosely mounted on a stud 386 fixed in platform 387 of a control lever 388 loosely mounted on shaft 389 supported in bearing lugs 390 of frame bracket 376. Lug 385 is equipped with a spring-pressed snap pin 391 (Fig. 2), the end of which engages with a hole in platform 387 thereby locking feeler 384 to the control lever 388. To the latter is attached a stop plate 392, which the stop pin 393 mounted on control rod 377 must pass during the reciprocating motion of the latter. Control lever 388 has on its hub a lug 394 which carries a tension spring 395 and a set screw 396. Tension spring 395 normally holds the lever 388 in a position in which the feeler plate 384 stands in the path of the advancing packages P. In this position stop plate 392 lies in the path of the reciprocating stop pin 393 and does not permit the latter to pass, thus causing ejecting plate 369 to remain in its rear or inoperative position. Control lever 388 is set in such a manner that, as soon as a package P touches feeler plate 384, and presses the latter slightly backward, stop plate 392 will move out of the path of stop pin 393 so the latter can resume its reciprocating motion, causing ejecting plate 369 to move correspondingly and thereby transfer the two foremost packages P from the delivery channel formed by guide 358 and 359, into the delivery guide formed by rails 366 and guide 367.

In case double stacking of the packages is not desired, feeler plate 384 may be swung out of the path of the packages in the delivery channel by lifting snap pin 391 out of engagement with the hole provided for this purpose in platform 387 and inserting pin 391 into hole 397 in platform 387. The packages then can be led in a single row directly from the delivery channel onto a suitable delivery table (not shown). Of course when feeler plate 384 is not in use, ejecting plate 369 will also remain locked in its rear or inoperative position.

In order to prevent scorching of the packages P by heater plates 344 and 345 during a stoppage of the machine, cam lever 330, which actuates plates 344 and 345, is equipped with a control lever 398 (Fig. 2) carrying a roller 399 held in contact with a cam segment 400 by tension spring 405. Segment 400 is pivoted to a stud 401 held by a bearing of rear frame 39, and equipped with an operating lug 402 which by means of a connecting rod 403 is actuated from a lever 404 attached to the clutch operating lever 35 of the wrapping machine. When the machine is stopped the roller 399 will be engaged by the high portion of segment 400, which causes control lever 398 to lift cam lever 330, thereby throwing heater plates 344 and 345 out of contact with the packages.

What is claimed is:

1. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper.

2. In a wrapping machine, the combination with a device for folding a wrapper about a package, of a web-feed operating to intermittently advance the leading end of a web of wrapping material across the entrance of said device, means for severing a wrapper blank from the leading end of the web, a package feed operating to push a package into the severed wrapper and through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said device including a vertical folding chute, and said package feed including a travelling endless chain, a pusher arm pivotally mounted on said chain to push a package downward through the chute, a control lever connected to said arm, a cam roller on said lever, a rotatable track section disposed adjacent the lower end of said chute to receive said roller, and means for periodically rotating said track section to retract the pusher from the package.

3. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said package feed including a package guide, a package chute leading to the wrapper folding device, a transfer arm adapted to push a package sidewise from said guide into said chute, means for actuating said transfer arm, and mechanism for incapacitating said arm actuating means while there is no package in the path of said arm.

4. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said package feed including a package guide, a package chute leading to said device, a transfer arm adapted to push a package sidewise from said guide into said chute, means for actuating said transfer arm, and mechanism for incapacitating said arm-actuating means and said web-feed while there is no package in the path of said arm.

5. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said web-feed including a continuously driven shaft, a pull roller fixed on said shaft, an oscillating arm loosely mounted on said shaft, a loop pick-up roller mounted on said arm and co-acting with the pull roller to pull the web continuously from a roll of wrapping material, a sprocket loosely mounted on said shaft, a pinion fixed to said sprocket, a sun gear fixed to said shaft, a pair of intermeshing planet gears on said arm meshing with said sun gear and pinion, respectively, the sun gear and its meshing planet gear having an equal number of teeth, whereby the sprocket is intermittently driven, and a pair of feed rollers intermittently driven from said sprocket, the web being looped back over said pick-up roller and led between said feed rollers.

6. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said web-severing means including a reciprocable cutting head, an arm attached to said head, a transversely bowed web-severing knife fastened to said arm, a V-shaped punch attached to the center of said knife and adapted to form a notch in the end of the wrapper blank being severed, a cutting die below said knife, and a clamping plate yieldingly mounted on said arm and adapted to clamp the web down on said die during the severing of the web.

7. In a wrapping machine, the combination with a device for folding a wrapper about a package, of a web-feed operating to intermittently advance the leading end of a web of wrapping material across the entrance of said device, means for severing a wrapper blank from the leading end of the web, a package feed operating to push a package into the severed wrapper and through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said mechanism including a stationary bottom guide plate, a stationary side guide rail, a swingable side guide rail opposite the stationary guide rail, and means for actuating said swingable guide rail to cause it to retreat, thereby permitting the entry of the leading end of the web between said guide rails, and thereafter move said swingable guide rail toward the stationary guide rail to push the severed wrapper blank edgewise against the latter to center the wrapper blank with respect to the path of the package.

8. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push a package into the severed wrapper and down through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said wrapper folding device including a stationary guide plate, a stationary rear plate opposite said guide plate and cooperating therewith to drape the wrapper in U-form about the advancing package, and a pair of stationary tuckers adapted to form bottom side tucks in the wrapper adjacent the forward end of the advancing package, and said adhesive applying means including a pair of stationary wicks arranged to apply adhesive to the sides of said tucks without touching the bottom of the tucks or the inner faces of the side flaps of the wrapper, and reservoirs communicating with said wicks for supplying adhesive thereto.

9. In a wrapping machine the combination with a vertical device for folding a wrapper about a package, of a web-feed operating to intermittently advance the leading end of a web of wrapping material across the entrance of said device, means for severing a wrapper blank from the leading end of the web, a package feed operating to push a package into the severed wrapper and down through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said wrapper folding device including a stationary longitudinally slotted folding chute adapted to drape the wrapper in U-form about the advancing package, form bottom side tucks in the wrapper adjacent the forward end of the advancing package, and fold the side flaps of the wrapper into overlapping relation on the sides of the package, and said adhesive applying means including a pair of stationary wicks arranged to apply adhesive to the sides of said tucks without touching the bottom of the tucks or the inner faces of the side flaps of the wrapper, reservoirs communicating with said wicks for supplying adhesive thereto, and adhesive applying wheels projecting through said slots to apply adhesive to the external surface of the inner side flaps.

10. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push a package into the severed wrapper and down through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said wrapper folding device including a pair of top tuckers for forming top tucks in the wrapper, and said adhesive applying means including wicks for transferring adhesive to the bottom and one side of said tuckers, whereby adhesive is applied to the bottom and one side of said tucks.

11. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push a package into the severed wrapper and down through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said wrapper folding device including a transversely slotted stationary wrapper folding chute adapted to drape the wrapper in U-form about the advancing package, said package feed including a pusher arm adapted to engage the top of the package and provided with a projecting adhesive carrying plate, and said adhesive applying means including a wick disposed in the path of said plate to apply adhesive thereto and a presser adapted to enter the slot in said chute and press one end of the wrapper against the adhesive coated plate to transfer adhesive to the inside of said wrapper end.

12. In a wrapping machine, the combination with a vertical device for folding a wrapper about a package, of a web-feed operating to intermittently advance the leading end of a web of wrapping material across the entrance of said device means for severing a wrapper blank from the leading end of the web, a package feed operating to push a package into the severed wrapper and down through said device, whereby the wrapper blank is folded about the package, mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said wrapper folding device including a movable top folder plate for folding down the inner top flap of the wrapper, and said adhesive applying means including a wick arranged to transfer adhesive to the bottom of said plate, whereby the external surface of said inner top flap is coated with adhesive.

13. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said wrapper folding device including a vertical wrapper folding chute, said package feed including a bottom guide arranged to receive the packages upright from said chute and a reciprocable pusher plate for advancing the packages along said guide, and said heating means including a movable top heater plate adapted to dry out the adhesive between the wrapper folds on the top of the packages, a pair of movable side heater plates adapted to dry out the adhesive between the wrapper folds on the sides of the packages, and mechanism for pressing the heater plates against the packages while the latter are at rest and moving the heater plates out of contact with the packages while the latter being advanced along said guide by said pusher plate.

14. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper and down through said device, whereby the wrapper blank is folded about the package, moving mechanism for centering the severed wrapper blank with respect to the path of the package into said device, means for applying adhesive between each fold of the wrapper while it is being folded, and means for heating the seams of the folded wrapper to dry out the adhesive between its folds and thus hermetically seal the wrapper, said heating means including a movable top heater plate adapted to dry out the adhesive between the wrapper folds on the top of the packages, a pair of movable side heater plates adapted to dry out the adhesive between the wrapper folds on the sides of the packages, and mechanism for pressing the heater plates against the packages while the latter are at rest and moving the heater plates out of contact with the packages while the latter are being advanced.

15. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push an upright package into the severed wrapper blank and down through said device, whereby the wrapper blank is folded about the package, and mechanism for receiving the wrapped packages upright in a single row from said package feed and delivering them upright in a double row.

16. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push an upright package into the severed wrapper blank and down through said device, whereby the wrapper blank is folded about the package, and mechanism for receiving the wrapped packages upright in a single row from said package feed and delivering them upright in a double row, said mechanism including a delivery channel arranged to receive the wrapped packages upright in a single row from said package feed, a delivery guide disposed at right angles to said channel and a reciprocable ejecting plate for pushing two packages at a time from the single row in said channel into said guide, whereby a double row of upright packages is advanced in said guide.

17. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push an upright package into the severed wrapper blank and through said device, whereby the wrapper blank is folded about the package, and mechanism for receiving the wrapped packages upright in a single row from said package feed and delivering them upright in a double row, said mechanism including a delivery channel arranged to receive the sealed and wrapped packages upright in a single row from said package feed, a delivery guide disposed at right angles to said channel, a reciprocable ejecting plate adapted to push the two foremost packages from the single row in said channel into said guide, an operating lever pivoted to said ejecting plate, an arm pivoted to said plate, a cam-actuated lever, a rod connected to said operating lever and cam-actuated lever, a stop pin on said rod, a control lever, a stop plate on said control lever disposed in the path of said stop pin to stop the forward movement of said ejecting plate, and a feeler plate on said control lever disposed to be pressed back with the control lever by the advancing packages in said delivery channel and thus to move the stop plate out of the path of the stop pin.

18. In a wrapping machine, the combination with a vertical device for folding a wrapper about a package, of a web-feed operating to intermittently advance the leading end of a web of wrapping material across the entrance of said device, means for severing a wrapper blank from the leading end of the web, a package feed operating to push a package into the severed wrapper blank and through said device, whereby the wrapper blank is folded about the package, and mechanism for receiving the wrapped packages in a single row from said package feed and delivering them in a double row, said mechanism including a delivery channel arranged to receive the wrapped packages in a single row from said package feed, a delivery guide arranged at right angles to said channel, a movable ejecting plate adapted to push the two foremost packages from the single row in said channel into said guide, an operating lever pivoted to said ejecting plate, a cam-actuated lever, a rod connected to said operating lever and cam-actuated lever, a stop pin on said rod, a control lever, a stop plate on said control lever disposed in the path of said stop pin to stop the forward movement of said ejecting plate, and a feeler plate on said control lever disposed to be pressed back with the control lever by the advancing packages in said delivery channel and thus to move the stop plate out of the path of the stop pin, said feeler plate being pivotally mounted on and releasably secured to said control lever, whereby said feeler plate may be swung out of package-engaging position to incapacitate said ejecting plate.

19. In a wrapping machine, the combination with spaced vertical members arranged to frictionally engage the side faces of a package inserted therebetween, for folding a wrapper about the package, of a web-feed operating to intermittently advance the leading end of a web of wrapping material horizontally above said members, means for severing a wrapper blank from the leading end of said web, a package feed operating to push a package into the severed wrapper blank and down between said members, whereby the wrapper blank is folded about the package, and means for applying adhesive between each fold of the wrapper while it is being folded about the package.

20. In a wrapping machine, the combination with spaced vertical members arranged to frictionally engage the side faces of a package inserted therebetween, for folding a wrapper about the package, of a web-feed operating to intermittently advance the leading end of a web of wrapping material horizontally above said members, means for severing a wrapper blank from the leading end of said web, a package feed operating to push a package into the severed wrapper blank and down between said members, whereby the wrapper blank is folded about the package, and means for applying adhesive between each fold of the wrapper while it is being folded about the package, members including a stationary guide plate, a stationary rear plate opposite said guide plate and cooperating therewith to drape the wrapper in U-form about the advancing package, and a pair of stationary tuckers adapted to form bottom side tucks in the wrapper adjacent the forward end of the advancing package, and said adhesive applying means including a pair of stationary wicks each arranged to apply adhesive to the sides of one of said tucks without touching the bottom of said tucks or inner faces of the side flaps of the wrapper, and reservoirs communicating with said wicks for supplying adhesive thereto.

21. In a wrapping machine, the combination with a vertical device for folding a wrapper about a package, of a web-feed operating to intermittently advance the leading end of a web of wrapping material across the entrance of said device, means for severing a wrapper blank from the leading end of said web, a package feed operating to push a package into the severed wrapper blank and down through said device, whereby the wrapper blank is folded about the package, and means for applying adhesive between each fold of the wrapper while it is being folded about the package, said wrapper folding device including a stationary longitudinally slotted folding chute adapted to drape the wrapper in U-form about the advancing package, form bottom side tucks in the wrapper adjacent the forward end of the advancing package, and fold the side flaps of the wrapper into overlapping relation on the sides of the package, and said adhesive applying means including a pair of stationary wicks each arranged to apply adhesive to the sides of the tucks without touching the bottom of the tucks or the inner faces of the side flaps of the wrapper, reservoirs communicating with said wicks for supplying adhesive thereto, and adhesive applying wheels projecting through the slots in said chute to apply adhesive to the external surface of the inner side flaps.

22. In a wrapping machine, the combination with a vertical device for folding a wrapper about a package, of a web-feed operating to intermittently advance the leading end of a web of wrapping material across the entrance of said device, means for severing a wrapper blank from the leading end of said web, a package feed operating to push a package into the severed wrapper blank and down through said device, whereby the wrapper blank is folded about the package, and means for applying adhesive between each fold of the wrapper while it is being folded about the package, said wrapper folding device including a pair of top tuckers for forming top tucks in the wrapper, and said adhesive applying means including wicks for transferring adhesive to the bottom and one side of said tuckers, whereby adhesive is applied to the bottom and one side of said top tucks.

23. In a wrapping machine, the combination with a device for folding a wrapper about a package, of a web-feed operating to intermittently advance the leading end of a web of wrapping material across the entrance of said device, means for severing a wrapper blank from the leading end of said web, a package feed operating to push a package into the severed wrapper blank and through said device, whereby the wrapper blank is folded about the package, and means for applying adhesive between each fold of the wrapper while it is being folded about the package, said wrapper folding device including a transversely slotted stationary wrapper folding chute adapted to drape the wrapper in U-form about the advancing package, said package feed including a pusher arm adapted to engage the top of the package and provided with a projecting adhesive carrying plate, and said adhesive applying means including a wick disposed in the path of said plate to apply adhesive thereto, and a presser adapted to enter the slot in said chute and press one end of the wrapper against the adhesive coated plate to transfer adhesive to the inside of said wrapper.

24. In a wrapping machine, the combination with a vertical device for folding a wrapper about a package, of a web-feed operating to intermittently advance the leading end of a web of wrapping material across the entrance of said device, means for severing a wrapper blank from the leading end of said web, a package feed operating to push a package into the severed wrapper blank and down through said device, whereby the wrapper blank is folded about the package, and means for applying adhesive between each fold of the wrapper while it is being folded about the package, said wrapper folding device including a movable top folded plate for folding down the inner top flap of the wrapper, and a top folder arm for folding the outer top flap of the wrapper down on said inner top flap, and said adhesive applying means including a wick arranged to transfer adhesive to the bottom of said plate, whereby the external surface of the inner top flap is coated with adhesive.

25. In a wrapping machine, the combination with a wrapper folding device, of a web-feed operating to intermittently advance the leading end of a web of wrapping material horizontally across the entrance of said device, means for severing a wrapper blank from the leading end of the web while it is at rest, and a package feed operating to push a package into the severed wrapper blank and down through said device, whereby the wrapper blank is folded about the package, said web-feed including a continuously driven shaft, a pull roller fixed on said shaft, an oscillating arm loosely mounted on said shaft, a loop pick-up roller mounted on said arm and coacting with the pull roller to pull the web continuously from a roll of wrapping material, a sprocket loosely mounted on said shaft, a pinion fixed on said sprocket, a sun gear fixed to said shaft, a pair of intermeshing planet gears on said arm meshing with said pinion and sun gear, respectively, the sun gear and its meshing planet gear having an equal number of teeth, whereby the sprocket is driven intermittently, and a pair of feed rollers intermittently driven from said sprocket, the web being looped back over said pick-up roller and led between said feed rollers.

26. In a wrapping machine, the combination with a vertical device for folding a wrapper about a package, of a web-feed operating to intermittently advance the leading end of a web of wrapping material horizontally across the entrance of said device, means for severing a wrapper blank from the leading end of the web, a package feed operating to push a package into the severed wrapper blank and through said device, whereby the wrapper blank is folded about the package, and moving mechanism for centering the severed wrapper blank with respect to the path of the package into said device.

27. In a wrapping machine, the combination with a device for folding a wrapper about a package, of a web-feed operating to intermittently advance the leading end of a web of wrapping material across the entrance of said device, means for severing a wrapper blank from the leading end of the web, a package feed operating to push a package into the severed wrapper blank and through said device, whereby the wrapper blank is folded about the package, and mechanism for centering the severed wrapper blank with respect to the path of the package into said device, said mechanism including a stationary bottom guide plate, a stationary side guide rail, a swingable side guide rail opposite said stationary rail, and means for actuating the swingable rail to cause it to retreat, thereby permitting the entry of the leading end of the web between said guide rails, and thereafter move the swingable guide rail toward the stationary guide rail to push the severed wrapper blank edgewise against the latter to center the wrapper blank with respect to the path of the package.

28. In a wrapping machine, the combination with a wrapper folding device, of a web-feed operating to intermittently advance the leading end of a web of wrapping material across the entrance of said device, means for severing a wrapper blank from the leading end of the web, and a package feed operating to push a package into said wrapper blank and through said device, whereby the wrapper blank is folded about the package, said device including a vertical wrapper chute, and said package feed including a travelling endless chain, a pusher arm pivotally mounted on said chain to push the package downward through said chute, a control lever connected to said arm, a cam roller on said lever, a rotatable track section disposed adjacent the lower end of said chute to receive said roller, and means for periodically rotating said track section to retract the pusher from the package.

29. In a wrapping machine, the combination with a vertical device for folding a wrapper, of a web-feed operating to intermittently feed the leading end of a web of wrapping material across the entrance of said device, mechanism for severing a wrapper blank from the leading end of the web, and a package feed operating to push a package into the severed wrapper blank and down through said device, whereby the wrapper blank is folded about the package, said package feed including a package guide, a package chute leading to said device, a transfer arm adapted to push a package sidewise from said guide into said package chute, means for actuating said arm, and package-controlled mechanism for incapacitating said means and said web feed.

30. In a wrapping machine, the combination with a vertical device for folding a wrapper about a package, of a web-feed operating to intermittently feed the leading end of a web of wrapping material horizontally across the entrance of said device, mechanism for severing a wrapper blank from the leading end of the web, and a package feed operating to push a package into the severed wrapper blank and down through said device, whereby the wrapper blank is folded about the package, said package feed including a package guide, a package chute leading to said device, a transfer arm adapted to push a package sidewise from said guide into said package chute, means for actuating said arm, and package-controlled mechanism for incapacitating said means.

31. In a wrapping machine, the combination with a device for folding a wrapper about a package, of a web-feed operating to intermittently advance the leading end of a web of wrapping material across the entrance of said device, and a package feed operating to push a package into the wrapping material and through said device, said device including a vertical folder chute, a travelling endless chain, a pusher arm pivotally mounted on said chain to push a package downward through said chute, a control lever connected to said arm, a cam roller on said lever, a rotatable track section disposed adjacent the lower end of said chute to receive said roller, and means for periodically rotating said track section to retract the pusher from the package.

32. In a wrapping machine, the combination with a vertical device for folding a wrapper about a package, of a web-feed operating to intermittently advance the leading end of a web of wrapping material across the entrance of said device, and a package feed operating to push a package down through said device, said package feed including a package guide, a package chute leading to said device, a transfer arm adapted to push a package sidewise from said guide into said chute, means for actuating said arm, and package-controlled mechanism for incapacitating said means and said web-feed.

33. In a wrapping machine, the combination with a vertical device for folding a wrapper about a package, of a web-feed operating to intermittently advance the leading end of a web of wrapping material across the entrance of said device, and a package feed operating to push a package down through said device, said package feed including a package guide, a package chute leading to said device, a transfer arm adapted to push a package sidewise from said guide into said chute, means for actuating said arm, and package-controlled mechanism for incapacitating said means.

34. In a wrapping machine, the combination with a vertical device for folding a wrapper about a package, of a web-feed operating to intermittently advance the leading end of a web of wrapping material across the entrance of said device, and a package feed operating to push a package into the wrapping material and down through said device, said web-feed including a continuously driven shaft, a pull roller fixed on said shaft, an oscillating arm loosely mounted on said shaft, a loop pick-up roller mounted on said arm and coacting with the pull roller to pull the web continuously from a roll of wrapping material, a sprocket loosely mounted on said shaft, a pinion fixed to said sprocket, a sun gear fast to said shaft, a pair of intermeshing planet gears on said arm meshing with said sun gear and pinion, respectively, the sun gear and its meshing planet gear having an equal number of teeth, whereby the sprocket is driven intermittently, and a pair of feed rollers driven from said sprocket, the web being looped back over said pick-up roller and led between said feed rollers.

35. The combination with a vertical wrapper folding chute, of a travelling endless chain, a pusher arm pivotally mounted on said chain to push a package downward through said chute, a control lever connected to said arm, a cam roller on said lever, a rotatable track section disposed adjacent the lower end of said chute to receive said roller and turn said control lever to retract the pusher from the package, another rotatable track section arranged to receive said cam roller during the upward travel of said control lever and turn the latter to return the pusher arm into position to engage a package during its subsequent downward travel.

36. The combination with vertical wrapper folding chute, of a travelling endless chain, a pusher arm pivotally mounted on said chain to push a package downward through said chute, a control lever connected to said arm, a cam roller on said lever, a rotatable track section disposed adjacent the bottom of said chute to receive said roller, and means for periodically rotating said track section to retract the pusher from the package.

37. The combination with a vertical device for folding a wrapper about a package, of a package guide arranged to receive packages from the packaging machine, a package chute leading to said device, a transfer arm adapted to push a package from said guide into said chute, means for actuating said arm, a slidable bridge plate normally covering the entrance of said device, a web-feed operating to intermittently advance the leading end of a web of wrapping material over said plate, means for severing a wrapper blank from the leading end of the web, and mechanism for retracting said plate and pushing a package through said chute and device, whereby the wrapper blank is folded about the package.

38. The combination with a vertical wrapper folding chute, of a package guide arranged to receive packages from a packaging machine, a vertical package chute aligned with said folding chute, a transfer arm adapted to push the packages from said guide into said package chute, means for actuating said arm, mechanism for incapacitating said means when there is no package in the path of said arm, a slidable bridge plate normally covering the entrance of said folding chute, a web-feed operating to intermittently advance the leading end of a web of wrapping material over said plate, a device for severing a wrapper blank from the leading end of the web, and mechanism for retracting said plate and pushing a package through said package chute into said folding chute to drape the severed wrapper blank about the package.

39. In a wrapping machine, the combination with a vertical device for folding a wrapper about a package, of a web-feed operating to intermittently advance the leading end of a web of wrapping material horizontally across the entrance of said device, a device for nicking the side edges of the web, means for severing a length of wrapping material from the leading end of the web to provide a wrapper blank having nicked side edges, a package feed for pushing a package into the severed wrapper blank and through said device, whereby the wrapper is folded about the package, and moving mechanism for centering the severed wrapper blank with respect to the path of the package into said device.

40. In a wrapping machine, the combination with a vertical device for folding a wrapper about a package, of a web-feed operating to intermittently advance the leading end of a web of wrapping material across the entrance of said device, a device for nicking the side edges of the web, means for severing a length of wrapping material from the leading end of the web to provide a wrapper blank having nicked side edges, a package feed for pushing a package into the severed wrapper blank and down through said device, whereby the wrapper is folded about the package, and mechanism for centering the severed wrapper blank with respect to the path of the package into said device, said web-severing means including a reciprocable cutting head, an arm attached to said head, a transversely bowed web-severing knife fastened to said arm, and a V-shaped punch attached to the center of said knife and adapted to form a notch in the end of the wrapper blank being severed.

41. In a wrapping machine, the combination with a vertical device for folding a wrapper about a package, of a web-feed operating to intermittently advance the leading end of a web of wrapping material across the entrance of said device, a device for nicking the side edges of the web, means for severing a length of wrapping material from the leading end of the web to provide a wrapper blank having nicked side edges, a package feed for pushing a package into the severed wrapper blank and down through said device, whereby the wrapper is folded about the package, and mechanism for centering the severed wrapper blank with respect to the path of the package into said device, said nicking device including a bed having a series of notches in its side edges and adapted to support the portion of the web to be nicked, a movable nicking arm, a clamp plate yieldingly mounted on said arm and having notches in its side edges registering with those of the bed, and pointed nicking knife blades supported from said arm in registry with the notches in said plate and bed, said blades being disposed to pierce the web within its side edges and cut outwardly to said edges during downward movement of said arm.

42. In a wrapping machine, the combination with a vertical device for folding a wrapper about a package, of a web-feed operating to intermittently advance the leading end of a web of wrapping material across the entrance of said device, a device for nicking the side edges of the web, means for severing a length of wrapping material from the leading end of the web to provide a wrapper blank having nicked side edges, a package feed for pushing a package into the severed wrapper blank and down through said device, whereby the wrapper is folded about the package, and mechanism for centering the severed wrapper blank with respect to the path of the package into said device, said nicking device including a movable nicking arm and pointed nicking knife blades supported from said arm, said blades being disposed to pierce the web within its side edges and cut outwardly to said edges during downward movement of said arm.

43. The combination with a vertical device for folding a wrapper about a package, of a package guide arranged to receive packages from a packaging machine, a package chute leading to said device, a transfer arm adapted to push a package from said guide into said chute, means for actuating said arm, mechanism for incapacitating said means, a by-pass guide aligned with said package guide to receive packages from said package guide while said means is incapacitated, a web-feed for intermittently advancing the leading end of a web of wrapping material across the entrance of said device, a knife for severing a wrapper blank from the leading end of the web, and a pusher for moving the package down through said chute and device, whereby the wrapper is folded about the package.

44. The combination with a device for folding a wrapper about a package, of a package guide arranged to receive packages from a packaging machine, a package chute leading to said device, a transfer arm adapted to push a package from said guide into said chute, means for actuating said arm, mechanism for incapacitating said means, a by-pass guide aligned with said package guide to receive packages from said package guide while said means is incapacitated, a web-feed for intermittently advancing the leading end of a web of wrapping material across the entrance of said device, a knife for severing a wrapper blank from the leading end of the web, and a pusher for moving the package through said chute and device, whereby the wrapper is folded about the package, said means including an oscillatory operating lever pivoted to said arm, a supporting lever pivoted to said arm, a stationary shaft, a sleeve loosely mounted on said shaft, a stud carried by said sleeve in position to obstruct the oscillation of said operating lever, and a feeler plate pivotally mounted on said sleeve and releasably secured thereto in position to be engaged by a package advanced into the path of said transfer arm, whereby said stud will be swung out of the path of said lever when said plate is engaged by a package and permit said arm to transfer the package into said package chute, and said plate may be swung up out of package-engaging position to permit the packages to be advanced into said by-pass guide from said package guide.

45. The combination with a vertical device for folding a wrapper about a package, of a package guide arranged to receive packages from a packaging machine, a package chute leading to said device, a transfer arm adapted to push a package from said guide into said chute, means for actuating said arm, mechanism for incapacitating said means, and a by-pass guide aligned with said package guide to receive packages from said package guide while said means is incapacitated.

46. The combination with a device for folding a wrapper about a package, of a package guide arranged to receive packages from a packaging machine, a package chute leading to said device, a transfer arm adapted to push a package from said guide into said chute, means for actuating said arm, mechanism for incapacitating said means, and a by-pass guide aligned with said package guide to receive packages from said package guide while said means is incapacitated, said means including an oscillatory operating lever pivoted to said arm, a supporting lever pivoted to said arm, a stationary shaft, a sleeve loosely mounted on said shaft, a stud carried by said sleeve in position to obstruct the oscillation of said operating lever, and a feeler plate pivotally mounted on said sleeve and releasably secured thereto in position to be engaged by a package advanced into the path of said transfer arm, whereby said stud will be swung out of the path of said lever when said plate is engaged by a package and permit said arm to transfer the package into said chute, and said plate may be swung up out of package-engaging position to permit the packages to be advanced into said by-pass guide from said package guide.

47. Wrapper centering mechanism comprising a stationary bottom guide plate, a stationary side guide rail, a swingable side guide rail opposite the stationary guide rail, and means for actuating said swingable guide rail to cause it to retreat and thereafter move it toward the stationary guide rail to push a wrapper in the space between said guide rails edgewise against the stationary guide rail to center the wrapper in predetermined position.

48. A package feed comprising a package guide, a package chute, a reciprocating transfer arm adapted to push a package sidewise from said guide into said chute, means for actuating said transfer arm, and package-controlled mechanism for incapacitating said means, said mechanism including a feeler disposed in the path of the packages in said guide and adapted to be raised above the same, and a manually operable device for retaining said feeler in its raised position to thus throw said mechanism out of operation.

49. A package feed comprising a travelling endless chain, a pusher arm pivotally mounted on said chain to push a package, a control lever connected to said arm, a cam roller on said lever, a rotatable track section disposed to receive said roller, and means for periodically rotating said track section to retract the pusher from the package.

50. The combination with a vertical device for folding a wrapper about a package, of means for applying adhesive between each fold of the wrapper being folded about the package, said wrapper folding device including a stationary guide plate, a stationary rear plate opposite said guide plate and cooperating therewith to drape the wrapper in U-form about the package, and a pair of stationary tuckers adapted to form bottom side tucks in the wrapper adjacent the forward end of the package, and said adhesive applying means including a pair of wicks arranged to apply adhesive to the sides of said tucks without touching the bottom of the tucks or the inner faces of the side flaps of the wrapper, and reservoirs communicating with said wicks for supplying adhesive thereto.

51. The combination with a vertical device for folding a wrapper about a package, of means for applying adhesive between each fold folded about the package, said device including a stationary longitudinally slotted folding chute adapted to drape the wrapper in U-form about the package, form bottom side tucks in the wrapper adjacent the forward end of the package, and fold the side flaps of the wrapper into overlapping relation on the sides of the package, and said adhesive applying means including a pair of stationary wicks arranged to apply adhesive to the sides of said tucks without touching the bottom of the tucks or the inner faces of the side flaps of the wrapper, reservoirs communicating with said wicks for supplying adhesive thereto, and adhesive applying wheels projecting through the slots in said chute to apply adhesive to the external surface of the inner side flaps.

52. The combination with a vertical device for folding a wrapper about a package, of means for applying adhesive between each fold of the wrapper being folded about the package, said device including a pair of top tuckers for forming top tucks in the wrapper, and said adhesive applying means including wicks for transferring adhesive to the bottom and one side of said tuckers, whereby adhesive is applied to the bottom and one side of said tucks.

53. The combination with a vertical device for folding a wrapper about a package, of means for applying adhesive between each fold of the wrapper being folded about the package, said device including a movable top folder plate for folding down the inner top flap of the wrapper, and said adhesive applying means including a wick arranged to transfer adhesive to the bottom of said plate, whereby the external surface of said inner top flap is coated with adhesive.

54. The combination with a vertical device for folding a wrapper about a package, of means for applying adhesive between each fold of the wrapper being folded about the package, and means for heating the seams of the folded wrapper to dry out the adhesive between its folds and thus to hermetically seal the wrapper, said heating means including a movable top heater plate adapted to dry out the adhesive between the wrapper folds on the top of the package, a pair of movable side heater plates adapted to dry out the adhesive between the wrapper folds on the sides of the package, and mechanism for moving said plates into and out of contact with the package.

55. The combination with a vertical device for folding a wrapper about a package, of means for applying adhesive between each fold of the wrapper being folded about a package, and means for heating the seams of the folded wrapper to dry out the adhesive between its folds and thus to hermetically seal the wrapper, said heating means including movable heater plates, automatic mechanism for moving said plates into and out of contact with the package, and a clutch operating lever connected to said mechanism to move said plates out of contact with the package whenever said lever is manually actuated.

56. The combination with a vertical folder chute, of mechanism for feeding a web of wrapping material across the upper end of said chute and then severing a wrapper blank therefrom, a traveling endless chain, a pusher arm pivotally mounted on said chain to push a package into said wrapper blank and down through said chute, whereby the package will be enfolded in the wrapper, and a movable member arranged externally of said chain to retract said pusher arm from the package when the latter reaches the lower end of the chute.

57. The combination with a vertical folder chute, of a traveling endless chain, a pusher arm pivotally mounted on said chain to push a package down through said chute, and a movable member arranged externally of said chain to retract said pusher from the package when the latter reaches the lower end of the chute.

58. A package feed comprising a traveling endless chain, a pusher arm pivotally mounted on said chain to push a package, and a movable member arranged externally of said chain to retract the pusher from the package.

59. In a wrapping machine, the combination with means for advancing packages in upright position, of a package delivery feed receiving the upright packages from said means in a single row and delivering them upright in a double row.

60. In a wrapping machine, the combination with means for advancing packages in upright position, of a package delivery feed receiving the upright packages from said means in a single row and delivering them upright in a double row, said feed including a delivery channel arranged to receive the upright packages in a single row from said means, a delivery guide disposed at right angles to said channel, and a reciprocable ejecting plate for pushing two upright packages at a time from the single row in said channel into said guide, whereby a double row of packages is advanced in said guide.

GEORGE W. GWINN.
CHARLES ARELT.
PETER M. NEJEDLY.